United States Patent
Hockin et al.

(10) Patent No.: US 12,026,667 B2
(45) Date of Patent: *Jul. 2, 2024

(54) DATA CAPTURE INSTRUCTIONS FOR ASSET TRACKING

(71) Applicant: Geotab Inc., Oakville (CA)

(72) Inventors: Robert Spencer Hockin, Milton (CA); Willem Petersen, Elmira (CA); Robert Bradley, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,466

(22) Filed: Apr. 13, 2023

(65) Prior Publication Data

US 2023/0252412 A1 Aug. 10, 2023

Related U.S. Application Data

(63) Continuation of application No. 17/008,106, filed on Aug. 31, 2020, now Pat. No. 11,640,577.

(Continued)

(51) Int. Cl.
G06Q 10/087 (2023.01)
G06F 16/23 (2019.01)
(Continued)

(52) U.S. Cl.
CPC ....... G06Q 10/087 (2013.01); G06F 16/2379 (2019.01); G06N 20/00 (2019.01);
(Continued)

(58) Field of Classification Search
CPC .. G06Q 10/087; G06F 16/2379; G06N 20/00; G07C 5/008; G07C 5/02; G07C 5/0808; G07C 5/085
(Continued)

(56) References Cited

U.S. PATENT DOCUMENTS 5,826,902 A 10/1998 Foo et al.
6,529,810 B2 3/2003 Foo et al.
(Continued)

FOREIGN PATENT DOCUMENTS

JP 2017-526020 A 9/2017
KR 20070041661 A * 4/2007 ............. H04N 23/69

OTHER PUBLICATIONS

KR-20070041661-A (Oh June Soo) (Apr. 19, 2007) (Machine Translation) (Year: 2007).*

(Continued)

*Primary Examiner* — Mahmoud Gimie
(74) *Attorney, Agent, or Firm* — Wolf, Greenfield & Sacks, P.C.

(57) ABSTRACT

Methods, systems, and devices for data capture instructions for asset tracking are provided. An example method for capturing data involves obtaining raw data from a data source onboard an asset and monitoring the raw data for satisfaction of a simplified data capture trigger. When the simplified data capture trigger is satisfied, a dataset simplification algorithm is performed on the raw data to generate a simplified set of raw data, and the simplified set of raw data is logged. The method further involves monitoring the raw data for satisfaction of a rich data capture trigger. When the rich data capture trigger is satisfied, an unsimplified block of raw data is identified and logged for rich data analysis. The data is transmitted to a server. The unsimplified block of raw data contains raw data that is additional to the raw data contained in the simplified set of raw data.

20 Claims, 13 Drawing Sheets

Related U.S. Application Data

(60) Provisional application No. 63/039,659, filed on Jun. 16, 2020.

(51) Int. Cl.
  *G06N 20/00* (2019.01)
  *G07C 5/00* (2006.01)
  *G07C 5/02* (2006.01)
  *G07C 5/08* (2006.01)

(52) U.S. Cl.
  CPC .............. *G07C 5/008* (2013.01); *G07C 5/02* (2013.01); *G07C 5/0808* (2013.01); *G07C 5/085* (2013.01)

(58) Field of Classification Search
  USPC ........................................................ 705/28
  See application file for complete search history.

(56) References Cited

U.S. PATENT DOCUMENTS

| | | | |
|---|---|---|---|
| 6,529,811 B2 | 3/2003 | Watson et al. |
| 7,057,503 B2 | 6/2006 | Watson et al. |
| 7,280,878 B1 | 10/2007 | Rossum |
| 7,359,781 B2 | 4/2008 | Foo et al. |
| 7,389,178 B2 | 6/2008 | Raz et al. |
| 7,499,779 B2 | 3/2009 | Geborek et al. |
| 7,698,036 B2 | 4/2010 | Watson et al. |
| 8,688,380 B2 | 4/2014 | Cawse et al. |
| 11,550,337 B2 * | 1/2023 | Hockin ................ G05D 1/0278 |
| 11,710,355 B1 | 7/2023 | Wenneman et al. |
| 2002/0035422 A1 | 3/2002 | Sasaki |
| 2003/0182041 A1 | 9/2003 | Watson |
| 2004/0199300 A1 | 10/2004 | Gustafsson et al. |
| 2005/0171660 A1 | 8/2005 | Woolford et al. |
| 2005/0234679 A1 | 10/2005 | Karlsson |
| 2006/0251293 A1 | 11/2006 | Piirainen et al. |
| 2008/0030345 A1 | 2/2008 | Austin et al. |
| 2009/0069153 A1 | 3/2009 | Liu et al. |
| 2009/0099735 A1 | 4/2009 | McCoy et al. |
| 2010/0057360 A1 | 3/2010 | Ohkubo |
| 2010/0207754 A1 | 8/2010 | Shostak et al. |
| 2010/0250021 A1 | 9/2010 | Cook et al. |
| 2011/0082626 A1 | 4/2011 | Foo et al. |
| 2011/0130906 A1 | 6/2011 | Mayer |
| 2011/0130916 A1 | 6/2011 | Mayer |
| 2011/0184645 A1 | 7/2011 | Chansarkar |
| 2011/0282553 A1 | 11/2011 | Foo et al. |
| 2013/0030642 A1 | 1/2013 | Bradley et al. |
| 2013/0282228 A1 | 10/2013 | Cawse et al. |
| 2017/0150442 A1 | 5/2017 | Cawse et al. |
| 2018/0137759 A1 | 5/2018 | Oh et al. |
| 2018/0232959 A1 | 8/2018 | Thornburg et al. |
| 2021/0389779 A1 | 12/2021 | Hockin et al. |
| 2021/0390497 A1 | 12/2021 | Hockin et al. |

OTHER PUBLICATIONS

U.S. Appl. No. 17/008,106, filed Aug. 31, 2020, Hockin et al.
EP21177305.6, Oct. 21, 2021, Extended European Search Report.
Extended European Search Report for European Application No. 21177305.6, dated Oct. 21, 2021.

* cited by examiner

DATA CAPTURE INSTRUCTIONS FOR ASSET TRACKING

RELATED APPLICATIONS

This application is a Continuation of U.S. Application Serial No. 17/008,106, filed Aug. 31, 2020, entitled "DATA CAPTURE INSTRUCTIONS FOR ASSET TRACKING", which claims the benefit under 35 U.S.C. § 119(e) to U.S. Provisional Application Ser. No. 63/039,659, titled "Data Capture Instructions And Trigger Configuration For Asset Tracking Devices", filed on Jun. 16, 2020. The contents of these applications are incorporated herein by reference in their entirety.

FIELD

The present disclosure relates to telematics, and in particular to asset tracking for telematics systems and the processing of data collected therefor.

BACKGROUND

A telematics system may track the location of an asset, such as a vehicle, and other data related to the asset, directly through the asset or through an asset tracking device located onboard the asset. The asset, or its asset tracking device, may communicate with a satellite navigation system, such as a Global Positioning System (GPS), Global Navigation Satellite System (GNSS), cellular tower network, Wi-Fi network, or other system to track the location of the asset. An asset tracking device may collect additional information via sensors on the asset tracking device, such as accelerometer data or other data. An asset tracking device may also collect information through a data connection with the asset itself, such as, in the case of a vehicular asset, through an onboard diagnostic port from which engine speed, battery temperature, fuel level, tire pressure, outside temperature, or other asset data may be obtained. Such data may be received and recorded by technical infrastructure of the telematics system and used in the provision of fleet management tools, other telematics services, or for further data analysis.

SUMMARY

According to an aspect of the disclosure, a method for capturing data from an asset or asset tracking device is provided. The method involves obtaining raw data from a data source onboard an asset and monitoring the raw data for satisfaction of a simplified data capture trigger. The method further involves, when the simplified data capture trigger is satisfied, performing a dataset simplification algorithm on the raw data to generate a simplified set of raw data, and logging the simplified set of raw data, and monitoring the raw data for satisfaction of a rich data capture trigger. The method further involves, when the rich data capture trigger is satisfied, identifying and logging an unsimplified block of raw data for rich data analysis. The unsimplified block of raw data spans a data window that covers a time at which the rich data capture trigger was satisfied. The unsimplified block of raw data contains raw data that is additional to the raw data contained in the simplified set of raw data. The method further involves transmitting the simplified set of raw data and the unsimplified block of raw data to a server.

Monitoring the raw data for satisfaction of the rich data capture trigger may involve evaluating the rich data capture trigger for a first data type, and the unsimplified block of raw data may include raw data of the first data type. Evaluation of the rich data capture trigger may include one or more of determining whether a value of a data point in the raw data of the first data type surpasses a first threshold value, and determining whether a composite value of a group of data points in the raw data of the first data type that spans an evaluation window surpasses a second threshold value. The unsimplified block of raw data further may include raw data of a second data type different from the first data type. The raw data of the second data type may span a supplementary data window that is greater in duration than the data window that is spanned by the raw data of the first data type. The asset may include a vehicle, the first data type may include a vehicle accelerometer data, and the second data type may include vehicle speed data or vehicle location data. The simplified set of raw data is to be processed for telematics services, and wherein the method further comprises flagging the unsimplified block of raw data for rich data analysis separate from processing of the simplified set of raw data for the telematics services. The rich data analysis may include machine learning analysis. The data source may include one or more of: an onboard diagnostic port of the asset, a locating device of the asset, a locating device of an asset tracking device onboard the asset, a sensor of the asset, and a sensor of an asset tracking device onboard the asset. The method may further involve buffering the raw data in a raw data buffer where the raw data is monitored for satisfaction of the simplified data capture trigger and the rich data capture trigger. The dataset simplification algorithm may include a line simplification algorithm that reduces a curve of raw data composed of line segments into a similar curve with fewer points.

According to another aspect of the disclosure, an asset tracking device is provided. The asset tracking device includes an interface layer to obtain raw data from a data source onboard an asset, a memory to store the raw data, and a controller to execute simplified data capture instructions. The controller executes the simplified data capture instructions to monitor the raw data for satisfaction of a simplified data capture trigger, and when the simplified data capture trigger is satisfied, perform a dataset simplification algorithm on the raw data to generate a simplified set of raw data and log the simplified set of raw data. The controller also executes rich data capture instructions to monitor the raw data for satisfaction of a rich data capture trigger, when the rich data capture trigger is satisfied, identify and log an unsimplified block of raw data for rich data analysis. The unsimplified block of raw data spans a data window that covers a time at which the rich data capture trigger was satisfied. The unsimplified block of raw data contains raw data that is additional to the raw data contained in the simplified set of raw data. The asset tracking device further includes a communication interface to transmit the simplified set of raw data and the unsimplified block of raw data to a server.

The asset tracking device may include a raw data buffer to store the raw data to be monitored for satisfaction of the simplified data capture trigger and the rich data capture trigger. The asset tracking device may include logging memory to store the logged simplified set of raw data and the logged unsimplified block of raw data prior to transmission by the communication interface to the server. The asset tracking device may further include a sensor to gather sensor data at the asset tracking device, and a locating device to obtain location data of the asset tracking device, wherein the data source comprises the sensor, the locating device, or an onboard diagnostic port of the asset, and wherein the interface layer comprises a first interface to obtain the sensor data from the sensor, a second interface to obtain the location data from the locating device, and a third interface to obtain asset data from the onboard diagnostic port.

According to yet another aspect of the disclosure, a non-transitory machine-readable storage medium is provided. The non-transitory machine-readable storage medium stores instructions that when executed cause a controller of an asset or asset tracking device to obtain raw data from a data source onboard the asset and monitor the raw data for satisfaction of a simplified data capture trigger. The instructions further cause the controller to, when the simplified data capture trigger is satisfied, perform a dataset simplification algorithm on the raw data to generate a simplified set of raw data, and log the simplified set of raw data. The instructions further cause the controller to monitor the raw data for satisfaction of a rich data capture trigger, and when the rich data capture trigger is satisfied, identify and log an unsimplified block of raw data for rich data analysis. The unsimplified block of raw data spans a data window that covers a time at which the rich data capture trigger was satisfied. The unsimplified block of raw data contains raw data that is additional to the raw data contained in the simplified set of raw data. The instructions further cause the controller to transmit the simplified set of raw data and the unsimplified block of raw data to a server.

The instructions may further cause the controller to monitor the raw data for satisfaction of the rich data capture trigger by evaluating the rich data capture trigger for a first data type, wherein the unsimplified block of raw data comprises raw data of the first data type. Evaluation of the rich data capture trigger may include one or more of: determining whether a value of a data point in the raw data of the first data type surpasses a first threshold value, and determining whether a composite value of a group of data points in the raw data of the first data type that spans an evaluation window surpasses a second threshold value. The unsimplified block of raw data may further include raw data of a second data type different from the first data type. The simplified set of raw data may be processed for telematics services, and w the instructions may further cause the controller to flag the unsimplified block of raw data for rich data analysis separate from processing of the simplified set of raw data for the telematics services.

According to yet another aspect of the disclosure, another method for capturing data from an asset or asset tracking device is provided. The method involves obtaining a rich data capture trigger that defines when a controller of an asset or an asset tracking device onboard the asset is to identify and log an unsimplified block of raw data in raw data on the asset tracking device for rich data analysis. The raw data is obtained by the asset tracking device from a data source onboard the asset. The method further involves transmitting data capture instructions to the asset tracking device. The data capture instructions contain the rich data capture trigger. The data capture instructions cause a controller of the asset tracking device to monitor the raw data for satisfaction of a simplified data capture trigger, and, when the simplified data capture trigger is satisfied, perform a dataset simplification algorithm on the raw data to generate a simplified set of raw data, and log the simplified set of raw data. The data capture instructions further cause the controller to monitor the raw data for satisfaction of a rich data capture trigger, and, when the rich data capture trigger is satisfied, identify and log an unsimplified block of raw data for rich data analysis. The unsimplified block of raw data spans a data window that covers a time at which the rich data capture trigger was satisfied. The unsimplified block of raw data contains raw data that is additional to the raw data contained in the simplified set of raw data. The method further involves receiving the simplified set of raw data and the unsimplified block of raw data from the asset tracking device.

The method may further involve providing a user interface to configure the rich data capture trigger, wherein the rich data capture trigger is obtained by configuration through the user interface. The user interface may further be to configure the data window. The data capture instructions may cause the controller to monitor the raw data for satisfaction of the rich data capture trigger by evaluating the rich data capture trigger for a first data type, the unsimplified block of raw data may include raw data of the first data type, and the user interface may further be to configure selection of the first data type. Evaluation of the rich data capture trigger may include one or more of: determining whether a value of a data point in the raw data of the first data type surpasses a first threshold value, wherein the user interface is further to configure the first threshold value, and determining whether a composite value of a group of data points in the raw data of the first data type that spans an evaluation window surpasses a second threshold value, wherein the user interface is further to configure the second threshold value. The unsimplified block of raw data may further include raw data of a second data type different from the first data type, and the user interface may further be to configure selection of the second data type. The raw data of the second data type may span a supplementary data window that is greater in duration than the data window that is spanned by the raw data of the first data type, and the user interface may further be to configure the supplementary data window. The unsimplified block of raw data may be flagged by the asset tracking device for separate treatment from the simplified set of raw data, and the method may further involve processing the simplified set of raw data for telematics services and performing rich data analysis on the unsimplified block of raw data.

According to yet another aspect of the disclosure, a system for capturing data from assets or asset tracking devices is provided. The system includes an asset tracking device onboard an asset. The asset tracking device is configured to obtain raw data from a data source onboard the asset, monitor the raw data for satisfaction of a simplified data capture trigger, and, when the simplified data capture trigger is satisfied, perform a dataset simplification algorithm on the raw data to generate a simplified set of raw data and log the simplified set of raw data. The asset tracking device is further configured to monitor the raw data for satisfaction of a rich data capture trigger, and, when the rich data capture trigger is satisfied, identify and log an unsimplified block of raw data for rich data analysis. The unsimplified block of raw data spans a data window that covers a time at which the rich data capture trigger was satisfied. The unsimplified block of raw data contains raw data that is additional to the raw data contained in the simplified set of raw data. The asset tracking device is further configured to transmit the simplified set of raw data and the unsimplified block of raw data. The system further includes one or more servers to obtain the rich data capture trigger, transmit data capture instructions to the asset tracking device, the data capture instructions containing the rich data capture trigger, receive the simplified set of raw data and the unsimplified block of raw data from the asset tracking device.

The one or more servers may further be to provide a user interface to configure the rich data capture trigger, wherein the rich data capture trigger is obtained by configuration through the user interface. The user interface may further be to configure the data window. The data capture instructions may cause the asset tracking device to monitor the raw data for satisfaction of the rich data capture trigger by evaluating the rich data capture trigger for a first data type, the unsimplified block of raw data may include raw data of the first data type, and the user interface may further be to configure selection of the first data type. Evaluation of the rich data capture trigger may include one or more of: determining whether a value of a data point in the raw data of the first data type surpasses a first threshold value, wherein the user interface is further to configure the first threshold value, and determining whether a composite value of a group of data points in the raw data of the first data type that spans an evaluation window surpasses a second threshold value, wherein the user interface is further to configure the second threshold value. The unsimplified block of raw data may further include raw data of a second data type different from the first data type, and the user interface may further ne to configure selection of the second data type. The raw data of the second data type may span a supplementary data window that is greater in duration than the data window that is spanned by the raw data of the first data type, wherein the user interface is further to configure the supplementary data window. The unsimplified block of raw data may be flagged by the asset tracking device for separate treatment from the simplified set of raw data, and the one or more servers may include a telematics services module to process the simplified set of raw data, and a rich data analysis module to perform rich data analysis on the unsimplified block of raw data.

According to another aspect of a disclosure, another non-transitory machine-readable storage medium is provided. The non-transitory machine-readable storage medium includes data capture control instructions that when executed cause a processor of a computing device to obtain a rich data capture trigger that defines when a controller of an asset tracking device onboard an asset is to identify and log an unsimplified block of raw data in raw data on the asset tracking device for rich data analysis, the raw data obtained by the asset tracking device from a data source onboard the asset, and transmit data capture instructions to the asset tracking device, the data capture instructions containing the rich data capture trigger. The data capture instructions cause a controller of the asset tracking device to monitor the raw data for satisfaction of a simplified data capture trigger, and, when the simplified data capture trigger is satisfied, perform a dataset simplification algorithm on the raw data to generate a simplified set of raw data, and log the simplified set of raw data. The data capture instructions further cause the controller to monitor the raw data for satisfaction of a rich data capture trigger, and when the rich data capture trigger is satisfied, identify and log an unsimplified block of raw data for rich data analysis and log the unsimplified block of raw data. The unsimplified block of raw data spans a data window that covers a time at which the rich data capture trigger was satisfied. The unsimplified block of raw data contains raw data that is additional to the raw data contained in the simplified set of raw data. The data capture control instructions further cause the processor of the computing device to receive the simplified set of raw data and the unsimplified block of raw data from the asset tracking device.

The data capture instructions may cause the controller to monitor the raw data for satisfaction of the rich data capture trigger by evaluating the rich data capture trigger for a first data type, the unsimplified block of raw data may include raw data of the first data type, and the data capture control instructions may further cause the processor to provide a user interface to configure the rich data capture trigger, the data window, and selection of the first data type, wherein the rich data capture trigger is obtained by configuration through the user interface. Evaluation of the rich data capture trigger may include one or more of: determining whether a value of a data point in the raw data of the first data type surpasses a first threshold value, wherein the user interface is further to configure the first threshold value, and determining whether a composite value of a group of data points in the raw data of the first data type that spans an evaluation window surpasses a second threshold value, wherein the user interface is further to configure the second threshold value. The unsimplified block of raw data further may include raw data of a second data type different from the first data type, the raw data of the second data type may span a supplementary data window that is greater in duration than the data window that is spanned by the raw data of the first data type, and the user interface may further be to configure selection of the second data type and the supplementary data window.

DETAILED DESCRIPTION

Figure 1:
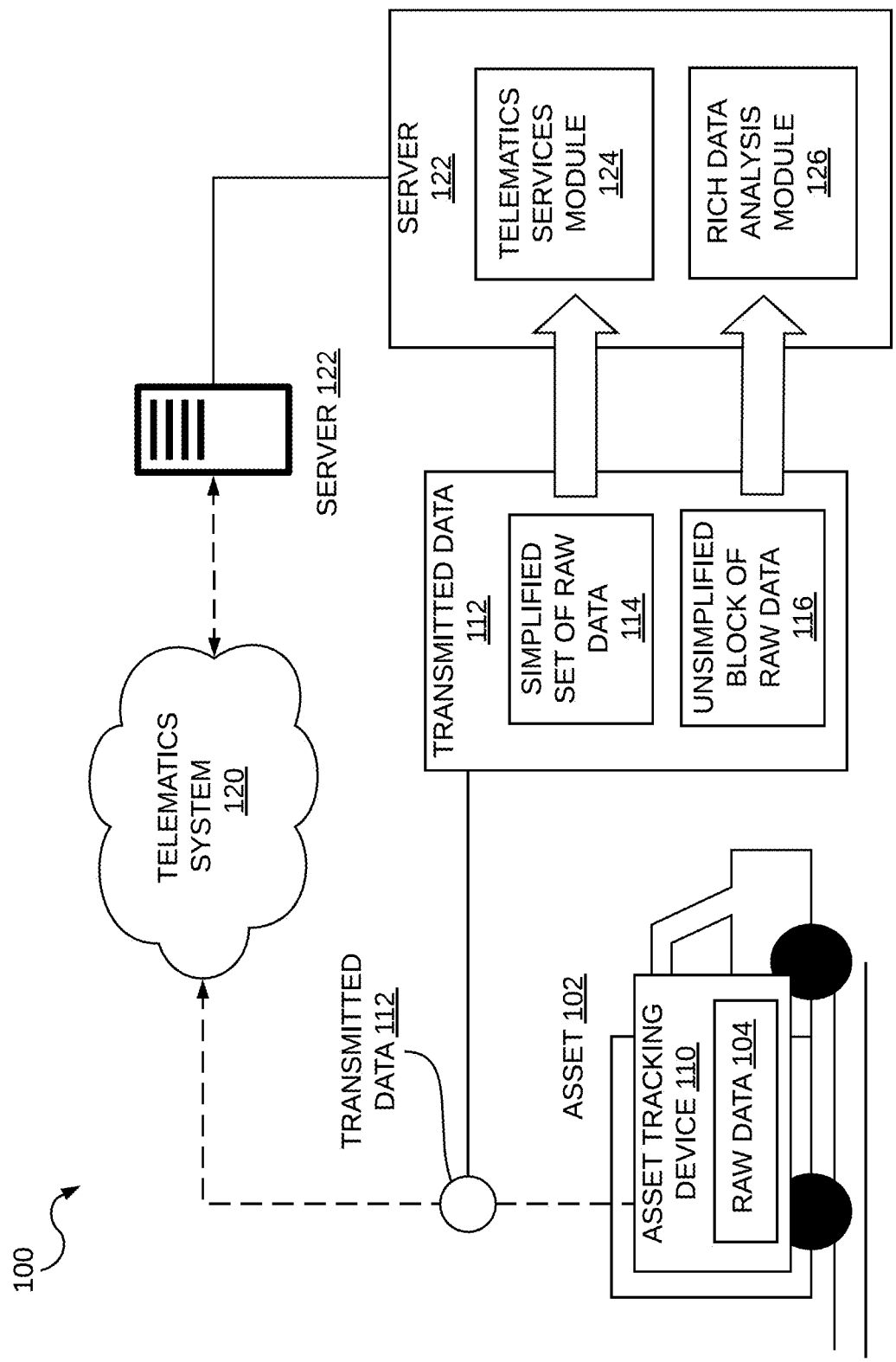
FIG. 1 is a schematic diagram of an example system for capturing data from an asset or asset tracking device.

A large telematics system may collect data from a very high number of assets, either directly or through asset tracking devices. An asset tracking device may refer to a self-contained device installed at an asset, or a tracking device that is integrated into the asset itself. In either case, it may be said that data is being captured by an asset tracking device. These asset tracking devices may be capable of collecting such large amounts of raw data that the technical infrastructure of the telematics system could be overwhelmed if all of the data that is collected by the devices were to be transmitted to, and processed by, the telematics system. Therefore, asset tracking devices in telematics systems generally transmit only a small proportion of the total number of data points collected for processing, and discard the remainder.

An asset tracking device may determine which points to transmit for processing and which data points to discard in a number of ways. For example, the asset tracking device may employ simple periodic sampling, whereby only the data that is collected at regularly spaced time intervals is retained for transmission. Alternatively, the data that is transmitted may be selected algorithmically by a dataset simplification algorithm, whereby only the most significant data points are transmitted. Thus, an asset tracking device may run a dataset simplification algorithm prior to transmitting data to a telematics system to reduce the data collection and processing load on the telematics system while ensuring that the transmitted data maintains a significant degree of utility.

The level of detail in the dataset that results from a dataset simplification algorithm may be tuned to be sufficient for fleet management tools and other telematics services without being unduly burdensome to the technical infrastructure of the telematics system. However, this simplified data may lack rich detail the that may be of interest for more advanced analytical techniques. Thus, an asset tracking device that only transmits data that has been passed through a dataset simplification algorithm may be unable to provide the levels of rich raw data to enable certain advanced analytics techniques, such as machine learning analysis.

The present disclosure provides techniques for capturing data from an asset tracking device that is sufficiently detailed for a telematics service without overburdening the technical infrastructure of the telematics system, while also capturing sufficiently rich raw data for analytical purposes. These techniques involve an asset tracking device applying a dataset simplification algorithm to the raw data it collects in parallel with a rich data capture algorithm. The asset tracking device employs a dataset simplification algorithm to sparingly select data points suitable for a telematics service, while also monitoring the raw data for the satisfaction of rich data capture triggers in which the raw data exhibits particular signal features that warrant further in-depth analysis. When a rich data capture trigger is satisfied, the asset tracking device captures a block of raw data that has not been simplified by the dataset simplification algorithm for further analysis, and forwards the rich block of raw data to the telematics system for further processing.

The application of a rich data capture algorithm in parallel with a dataset simplification algorithm may enable the asset tracking device to capture rich detail around select incidents that would have otherwise been missed by the dataset simplification algorithm. For example, in the case of an asset tracking device tracking a vehicle travelling down a bumpy road, a dataset simplification algorithm would typically avoid logging small bumps and other perturbations in accelerometer data. However, a rich data capture algorithm may be configured to monitor the same raw data that is being fed through the dataset simplification algorithm for particularly interesting features in the accelerometer data—such as a signal feature that is indicative of the vehicle travelling over a pothole—and capture a rich block of raw accelerometer data when the particular signal feature is detected that more thoroughly describes the event. The block of raw data may provide significantly greater insight into the circumstances surrounding the pothole incident than would have been apparent in the data produced by the dataset simplification algorithm. The rich data collected by the rich data capture algorithm may be fed into machine learning models and other analyses for which there may otherwise be insufficient quantities of data to support.

Any adverse impacts to the technical infrastructure of the telematics system caused by the transmission of large blocks of raw data may be controlled by configuring the rich data capture trigger to capture only a narrow window of data surrounding the event. Thus, the technical infrastructure of the telematics system may collect small snippets of rich raw data covering particularly interesting periods of time without undue burden. Further, these rich data capture triggers may be configured remotely and pushed to select groups of asset tracking devices on-demand and on a device-by-device so the data collection of the telematics system as a whole is not largely affected by any experimental studies using rich data capture triggers. Thus, a telematics system may remain efficient in its collection of data to support its telematics services without missing opportunities for more rigorous data analysis.

FIG. 1 is a schematic diagram of an example system 100 for capturing data from an asset or asset tracking device. The system 100 includes an asset tracking device 110 installed at an asset 102. The asset tracking device 110 collects data, such as the location of the asset tracking device 110 and sensor data from sensors onboard the asset tracking device 110. In some examples, such as in the case where the asset 102 is a vehicle, the asset tracking device 110 collects asset data directly from the asset 102 through an onboard diagnostic port. This data is indicated generally as raw data 104.

For collecting location data, the system 100 may further include a locating system (not shown) for tracking the locations of one or more asset tracking devices, including the asset tracking device 110, such as a Global Positioning System (GPS), a Global Navigation Satellite System (GNSS), a cellular tower network, Wi-Fi networks, or another system which enables the monitoring of the location of asset tracking devices.

For exemplary purposes, the asset 102 is shown as a vehicular asset: a transport truck. However, the asset 102 may include any type of vehicular asset, such as a passenger vehicle, construction vehicle, other utility vehicle, naval vessel, airplane, or any other vehicular asset that may be tracked by an asset tracking device. The asset 102 may also include any non-vehicular asset, such as a transport trailer, shipping container, pallet, shipped good, or any other asset which may be tracked by an asset tracking device. Further, in other examples, the asset 102 may include a vehicle or other asset that includes an integrated tracking device (the asset tracking device 110) to capture data related to the asset 102.

The system 100 further includes technical infrastructure of a telematics system, indicated as the telematics system 120. The telematics system 120 records location data, travel histories, and other data captured by asset tracking devices, including the asset tracking device 110. The telematics system 120 stores information collected from the asset tracking devices, such as location data, accelerometer data, gyroscope data, temperature sensor data, vehicle speed data, or any other data collected by an asset tracking device. The telematics system 120 may further store user accounts and other data associated with the asset tracking devices for the provision of telematics services.

The technical infrastructure of the telematics system 120 includes one or more computing devices, indicated, for example, as a server 122. The server 122 includes a communication interface to communicate with asset tracking devices via one or more computing networks and/or telecommunication networks, a memory to store data, and a controller to execute the methods performed by the telematics system 120 as described herein. For example, the server 122 is shown to provision a telematics services module 124 which provides telematics services to client devices (not shown) using data collected from asset tracking devices. The server 122 is further shown to provision a rich data analysis module 126 which may be employed to analyze data collected from asset tracking devices, as will be discussed in greater detail below.

A portion of the raw data 104 collected by the asset tracking device 110 is transmitted to the telematics system 120, indicated as transmitted data 112. The transmitted data 112 includes a simplified set of raw data 114 for the provision of telematics services, for example, at the telematics services module 124. The transmitted data 112 further includes an unsimplified block of raw data 116 for rich data analysis, for example, at the rich data analysis module 126. The simplified set of raw data 114 is derived from the application of a dataset simplification algorithm on the raw data 104 collected by the asset tracking device 110. By running a dataset simplification algorithm, only the significant points of data are transmitted to the telematics system 120 without overburdening its technical infrastructure. However, rich raw data that one may wish to obtain from the asset tracking device 110 may be deliberately excluded by such dataset simplification algorithms. Thus, the asset tracking device 110 also runs a rich data capture algorithm to obtain the unsimplified block of raw data 116 from the raw data 104 for rich data analysis. This rich data capture algorithm may run in parallel with the dataset simplification algorithm used to generate the simplified set of raw data 114. Example methods by which the asset tracking device 110 obtains and transmits such data are discussed in greater detail below.

Figure 2:
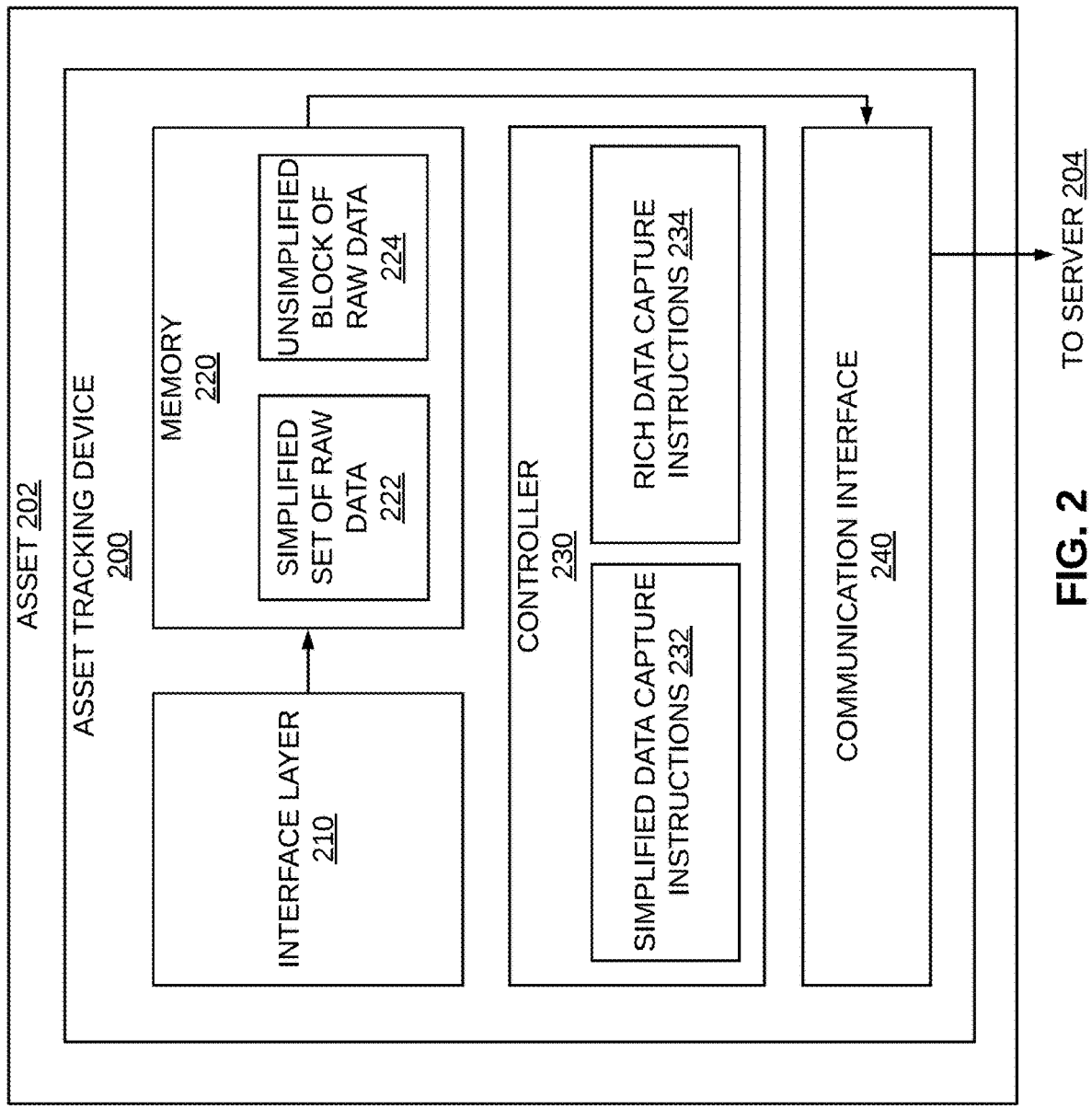
FIG. 2 is a block diagram of an example asset tracking device that captures simplified data for a telematics service and rich data for rich data analysis.

FIG. 2 is a block diagram of an example asset tracking device 200 that captures simplified data and rich data. The asset tracking device 200 may be understood to be one example of the asset tracking device 110 of FIG. 1. The asset tracking device 200 is onboard an asset 202, which may be similar to the asset 102 of FIG. 1.

The asset tracking device 200 includes an interface layer 210 to obtain raw data from a data source onboard the asset 202. The data source may include a sensor of the asset tracking device 200, a sensor of the asset 202, a locating device of the asset tracking device 200 (e.g., a GPS device located on the asset tracking device 200), a locating device of the asset 202 (e.g., a GPS device located on the asset), or, in examples in which the asset 202 is a vehicle, an onboard diagnostic port of the asset 202. In any case, the interface layer 210 obtains raw data from such a data source and includes one or more interfaces for receiving raw data from the data source.

The asset tracking device 200 further includes a memory 220 that stores at least a portion of the raw data collected through the interface layer 210, including a simplified set of raw data 222 and an unsimplified block of raw data 224. As discussed herein, the simplified set of raw data 222 is derived from a dataset simplification algorithm, and the unsimplified block of raw data 224 is derived from a rich data capture algorithm. The memory 220 may include read-only memory (ROM), random-access memory (RAM), flash memory, magnetic storage, optical storage, and similar, or any combination thereof. Although only a single simplified set of raw data 222 and a single unsimplified block of raw data 224 are shown, this is for illustrative purposes only, and it is to be understood that the memory 220 may contain several simplified sets of raw data 222 and several unsimplified blocks of raw data 224 at a time. The number of such data sets and data blocks stored on the memory 220 at any given time may depend on a number of factors, such as the memory size of the memory 220, the frequency with which such data are logged, and the frequency with which such data are transmitted to a telematics system.

The asset tracking device 200 further includes a controller 230 to execute simplified data capture instructions 232 and rich data capture instructions 234. The controller includes one or more of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 includes a memory, which may include ROM, RAM, flash memory, magnetic storage, optical storage, and similar, or any combination thereof, for storing instructions and data as discussed herein, including the simplified data capture instructions 232 and rich data capture instructions 234.

The simplified data capture instructions 232 cause the controller 230 to monitor the raw data collected by the asset tracking device 200 for satisfaction of a simplified data capture trigger, and, when the simplified data capture trigger is satisfied, perform a dataset simplification algorithm on the raw data to generate the simplified set of raw data 222, and, log the simplified set of raw data 222.

The simplified data capture trigger may be triggered based on hardware limitations of the asset tracking device 200, such as, for example, when a raw data buffer reaches a limit to the amount of raw data it can store, or based on telematics service standards, such as, for example, a frequency with which the data at the telematics system is to be updated. Example simplified data capture triggers are described with reference to FIG. 7, below.

The dataset simplification algorithm determines which data points should be recorded for transmission to the telematics system (i.e., the data points that are most useful to providing a telematics service), and which data points should be discarded (i.e., the data points which provide little useful information to a telematics service). The dataset simplification algorithm may include a line simplification algorithm that reduces a curve of raw data composed of line segments into a similar curve with fewer points. An example of such a line simplification algorithm is the Ramer-Douglas-Peucker algorithm.

The rich data capture instructions 234 cause the controller 230 to monitor the raw data for satisfaction of a rich data capture trigger, and when the rich data capture trigger is satisfied, identify and log the unsimplified block of raw data 224 for rich data analysis.

The rich data capture trigger is a trigger that detects a feature of the raw data that warrants further analysis (e.g., a significant disturbance in kinematic sensor data), and causes a block of raw data that captures the event to be stored and transmitted to the telematics system. Evaluation of the raw data capture trigger may involve determining whether a value of a data point in the raw data of the first data type surpasses a threshold value (e.g., when accelerometer data in the Z axis exceeds 2.5 g), determining whether a composite value of a group of data points in the raw data of the first data type that spans an evaluation window surpasses a threshold value (e.g., when a change in engine voltage of greater than 0.5V is detected within a one-second or a two-second window, or when the sum of X axis accelerometer data and Y axis accelerometer data exceeds a threshold more than five times within ten seconds), or by another determination. Example rich data capture triggers are described with reference to FIG. 7, below.

Monitoring the raw data for satisfaction of the rich data capture trigger may involve evaluating the rich data capture trigger for a first data type. That is, the rich data capture trigger may detect a particular signal feature in a particular data type, such as accelerometer data, gyroscope data, vehicle speed data, engine temperature data, or another data type. Further, the unsimplified block of raw data 224 may comprise raw data of this first data type. That is, when the rich data capture trigger detects a particular signal feature in accelerometer data, the rich data capture trigger causes a block of accelerometer sensor data to be logged and transmitted to the telematics system.

Further, the unsimplified block of raw data 224 may also comprise raw data of a second data type that is different from the first data type. The second data type may be complementary to the first data type in that it may provide additional contextual information about the event that triggered the satisfaction of the rich data capture trigger. For example, in the case of a rich data capture trigger that is designed to capture information surrounding possible vehicle accidents or collisions, the first data type may be a kind of vehicle kinematic data (e.g., accelerometer data or gyroscope data), which is likely to provide the strongest indicator of a collision, and the second data type may include vehicle speed data or vehicle location data, which is likely to provide useful contextual information surrounding the collision.

The unsimplified block of raw data 224 spans a data window that covers a time at which the rich data capture trigger was satisfied. The data window may be sufficiently large and of sufficient resolution to provide sufficient contextual information surrounding the event that triggered the rich data capture trigger so that advanced data analysis techniques, such as machine learning techniques, may be applied to the unsimplified block of raw data 224. In other words, advantageously, the unsimplified block of raw data 224 contains raw data that is additional to the raw data contained in the simplified set of raw data 222. That is, the unsimplified block of raw data 224 contains raw data that was discarded by the dataset simplification algorithm that was used to generate the simplified set of raw data 222.

Figure 8:
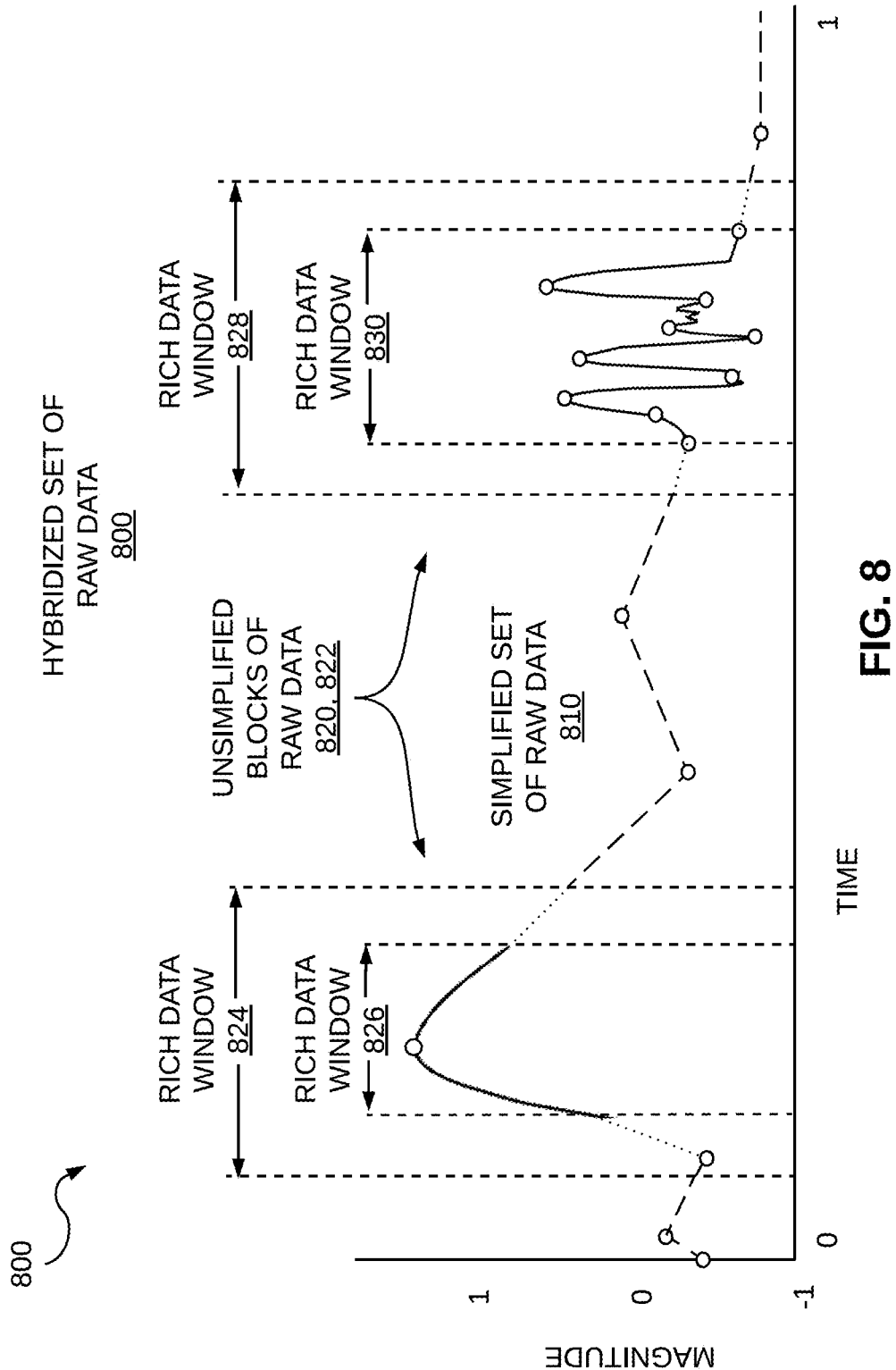
FIG. 8 is another data plot displaying another example hybridized set of raw data, the data plot showing differently sized data windows corresponding to different raw data types collected in unsimplified blocks of raw data.

The unsimplified block of raw data 224 may capture raw data both before and after the time at which the rich data capture trigger is satisfied. When the unsimplified block of raw data 224 contains more than one type of raw data, the data window for any of the types of raw data may be different. In the example above regarding vehicle accident detection, the data window for vehicle accelerometer data may span about two seconds (about 1 second on either side of the signal feature that satisfied the trigger), but the data window for vehicle location data may span about ten seconds (about 5 seconds on either side of the signal feature). The data window for the second type of raw data may be different from the data window for the first type of raw data for hardware limitation reasons. For example, vehicle location data may only include data points that were gathered about every second, and thus, a data window that is larger than one second will capture significantly more data points of location data than a data window spanning only one second. The data windows for data types that are collected at a higher rate (e.g., accelerometer data) may be smaller than data windows for data types that are collected at a lower rate (e.g., vehicle location data) to ensure that adequate amounts of data of each data type are captured without capturing an unduly large amount of data. Other examples of data windows of different sizes are illustrated in FIG. 8, below.

Typically, the unsimplified block of raw data 224 may be an unedited block of all of the data points of the relevant data types that were collected by the asset tracking device 200 throughout the relevant data windows surrounding the event that led to the satisfaction of the rich data capture trigger. In some examples, the unsimplified block of raw data 224 need not contain an entirely unedited block of raw data. It is contemplated that the simplified block of raw data 224 may be reduced from the actual raw data collected by the asset tracking device 200, by, for example, various data smoothing, filtration, interpolation, averaging, or other data reduction means, provided that the unsimplified block of raw data 224 is not simplified in the same manner as the simplified set of raw data 222 and retains more resolution than the simplified set of raw data 222.

Further, although the additional contextual data that is captured in addition to the data type that triggers a rich data capture trigger may be collected from raw data, in some examples, such additional contextual data may be collected from data that has already been processed by a dataset simplification algorithm. Thus, while the contextual data may not necessarily provide additional raw data points, the contextual data may be bundled together with the additional raw data collected by the rich data capture trigger to provide additional context.

The asset tracking device 200 further includes a communication interface 240 to transmit the simplified set of raw data 222 and the unsimplified block of raw data 224 a server 204 of a telematics system, which may be similar to the server 122 of the telematics system 120 of FIG. 1. The communication interface 240 may include a cellular modem, such as an LTE-M modem, CAT-M modem, or other cellular modem configured for bidirectional communication via the network with which asset tracking device 200 may communicate with the server 204.

The unsimplified block of raw data 224 may be flagged (at any point between logging and transmission) as being intended for separate processing from the simplified set of raw data, which will generally be used to support telematics services. Thus, the unsimplified block of raw data 224 may be rerouted by the server 204 to an appropriate place for data analysis (e.g., the rich data analysis module 126 of FIG. 1), without disrupting the telematics service with large quantities of rich data.

Further, each unsimplified block of raw data 224 may be labelled according to the particular rich data capture trigger used to capture the data. For example, an unsimplified block of raw data 224 that was captured due to the detection of a disturbance in accelerometer data that may be indicative of a vehicle collision, that unsimplified block of raw data 224 may be labelled as potentially pertaining to a vehicle collision. Similarly, an unsimplified block of raw data 224 that was captured due to the detection of a disturbance in accelerometer data that may be indicative of the asset travelling over a pothole, that unsimplified block of raw data 224 may be labelled as potentially pertaining to a pothole incident. Thus, researchers may be able to analyze the unsimplified blocks of raw data 224 and track the emergence of such raw data more effectively.

Thus, the asset tracking device 200 may provide a telematics system with both simplified data for a telematics service and rich data for more rigorous data analysis when particular signal features are detected in the raw data.

Figure 3:
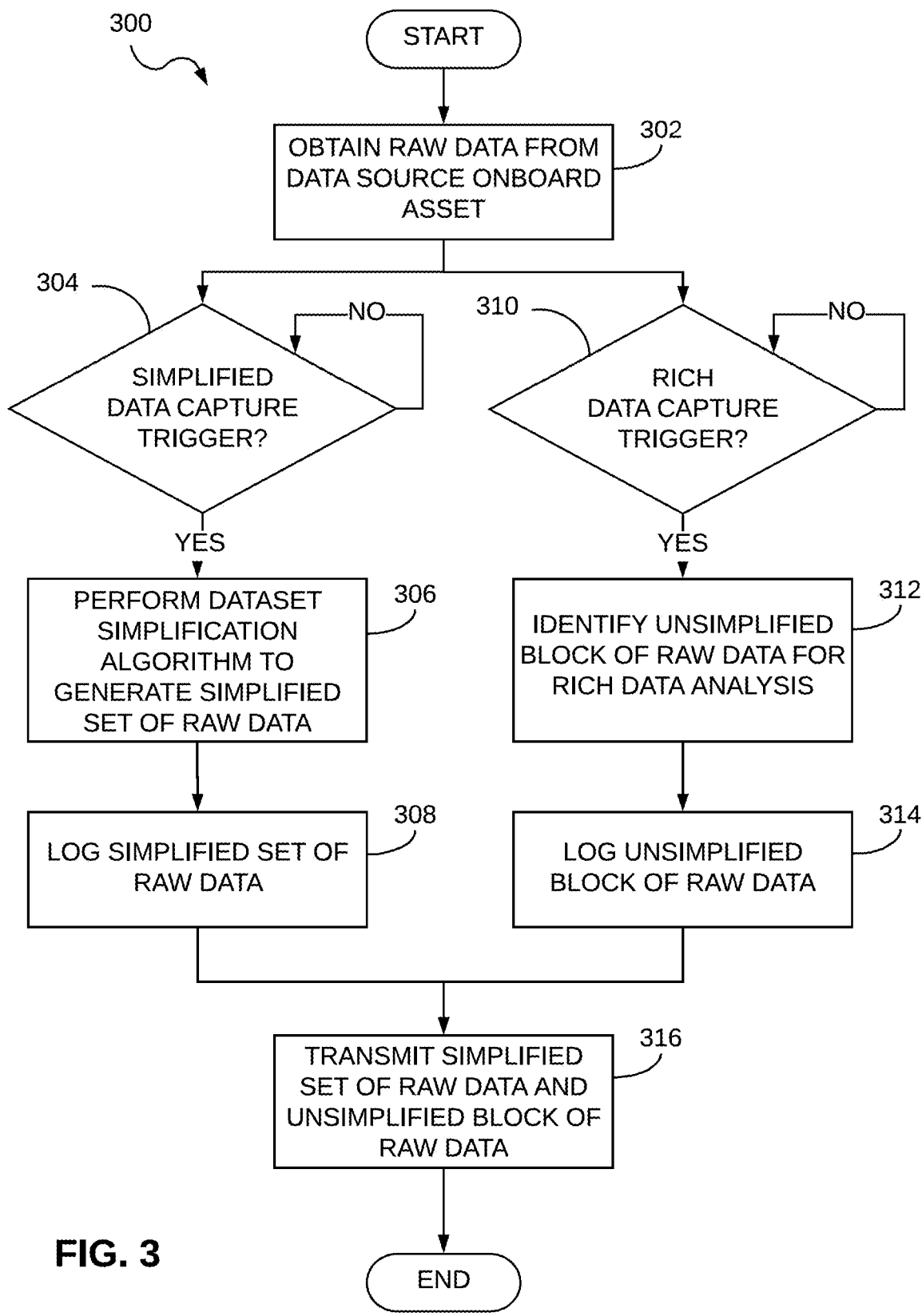
FIG. 3 is a flowchart of an example method for capturing data from an asset or asset tracking device.

FIG. 3 is a flowchart of an example method 300 for capturing data from an asset or asset tracking device. The method 300 may be understood to be one example of how the asset tracking device 200 of FIG. 2 captures raw data relating to an asset. Thus, for exemplary purposes, the method 300 will be described with reference to the asset tracking device 200 of FIG. 2. Further, the blocks of the method 300 are elaborated upon above with reference to the appropriate components of the asset tracking device 200 of FIG. 2. However, it is to be understood that the method 300 may be applied by other asset tracking devices.

At block 302, the interface layer 210 of the asset tracking device 200 obtains raw data from a data source onboard the asset 202. As described above, the data source may include a sensor, locating device, or onboard diagnostic port.

At block 304, the controller 230 monitors the raw data for satisfaction of a simplified data capture trigger. The simplified data capture trigger is included in the simplified data capture instructions 232. As described above, the simplified data capture trigger is a trigger that determines when the raw data is to be evaluated for simplification and logged for transmission to a telematics system.

At block 306, when the simplified data capture trigger is satisfied, the controller 230 performs a dataset simplification algorithm on the raw data to generate the simplified set of raw data 222, and at block 308, logs the simplified set of raw data 222 in memory 220. As described above, the dataset simplification algorithm determines which data points should be recorded for transmission to the telematics system and which data points should be discarded.

At block 310, the controller 230 monitors the raw data for satisfaction of a rich data capture trigger. The rich data capture trigger is included in the rich data capture instructions 234. Monitoring of the raw data for the rich data capture trigger may take place in parallel with monitoring the raw data for the simplified data capture trigger. As described above, the rich data capture trigger is a trigger that detects a feature of the raw data that warrants further analysis, and causes a block of raw data that captures details surrounding the event to be stored and transmitted to the telematics system.

At block 312, when the rich data capture trigger is satisfied, the controller 230 identifies the unsimplified block of raw data 224 in the raw data for rich data analysis and, at block 314, logs the unsimplified block of raw data 224 in memory 220. As described above, the unsimplified block of raw data 224 spans a data window that covers a time at which the rich data capture trigger was satisfied, and may include one or more data types spanning one or more data windows.

At block 316, the communication interface 240 transmits the simplified set of raw data 222 and the unsimplified block of raw data 224 to the server 204. As described above, these data may be flagged and/or transmitted separately or together according to any program that controls the transmission of data from the asset tracking device 200 to the server 204, and may be used in a telematics service or for rich data analysis, as appropriate.

The method 300 may be embodied in instructions (such as the simplified data capture instructions 232 and rich data capture instructions 234) stored on a non-transitory machine-readable storage medium that is executable by the controller 230 to perform the method 300. The non-transitory machine-readable storage medium may include ROM, RAM, flash memory, magnetic storage, optical storage, and similar, or any combination thereof, for storing instructions and data as discussed herein.

Thus, a non-transitory machine-readable storage medium may contain instructions that when executed cause the controller 230 to obtain raw data from a data source onboard the asset 202 and monitor the raw data for satisfaction of a simplified data capture trigger. When the simplified data capture trigger is satisfied, the instructions may cause the controller 230 to perform a dataset simplification algorithm on the raw data to generate the simplified set of raw data 222 and log the simplified set of raw data 222. The instructions may further cause the controller 230 to monitor the raw data for satisfaction of a rich data capture trigger. When the rich data capture trigger is satisfied, the instructions may cause the controller 230 to identify the unsimplified block of raw data 224 in the raw data for rich data analysis, log the unsimplified block of raw data 224, and transmit the simplified set of raw data 222 and the unsimplified block of raw data 224 to a server. The unsimplified block of raw data 224 may span a data window that covers a time at which the rich data capture trigger was satisfied. The unsimplified block of raw data 224 may contain raw data that is additional to the raw data contained in the simplified set of raw data.

Figure 4A:
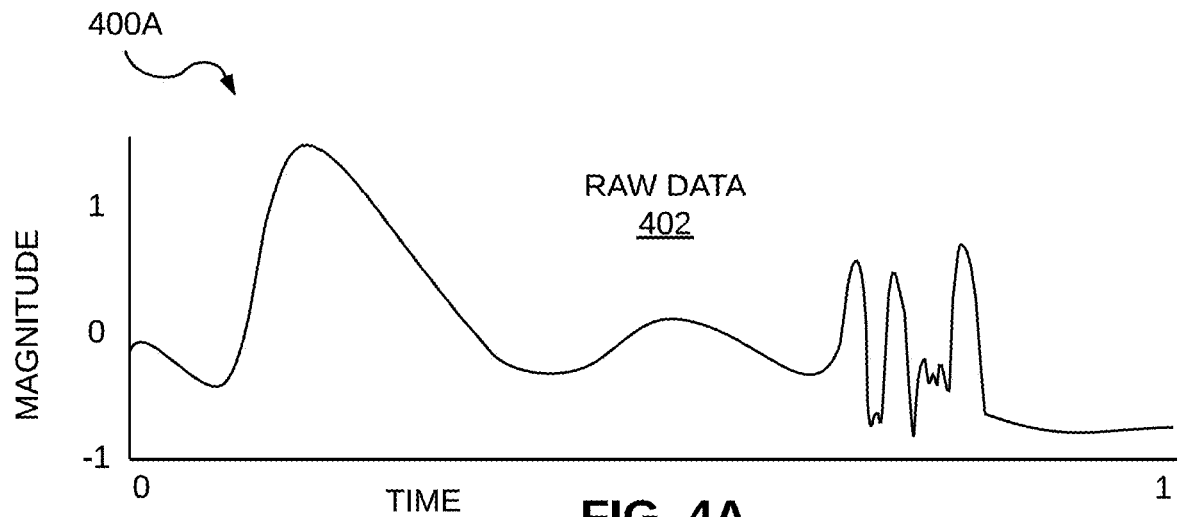
FIG. 4A is a data plot displaying example raw data collected at an asset or asset tracking device.

FIG. 4A is a data plot 400A displaying example raw data 402 collected at an asset or asset tracking device. The raw data 402 may be understood to be one example of the raw data collected by the asset tracking device 200 of FIG. 2. The raw data may include any data collected from a data source onboard an asset. For example, the raw data 402 may be a composite of XY plane accelerometer data collected from an accelerometer of the asset tracking device. The raw data 402 is shown in a smooth solid line to indicate that the raw data 402 is of high resolution. The data plot 400A is shown with arbitrary units of magnitude along the Y axis and arbitrary units of time along the X axis for exemplary purposes only.

Figure 4B:
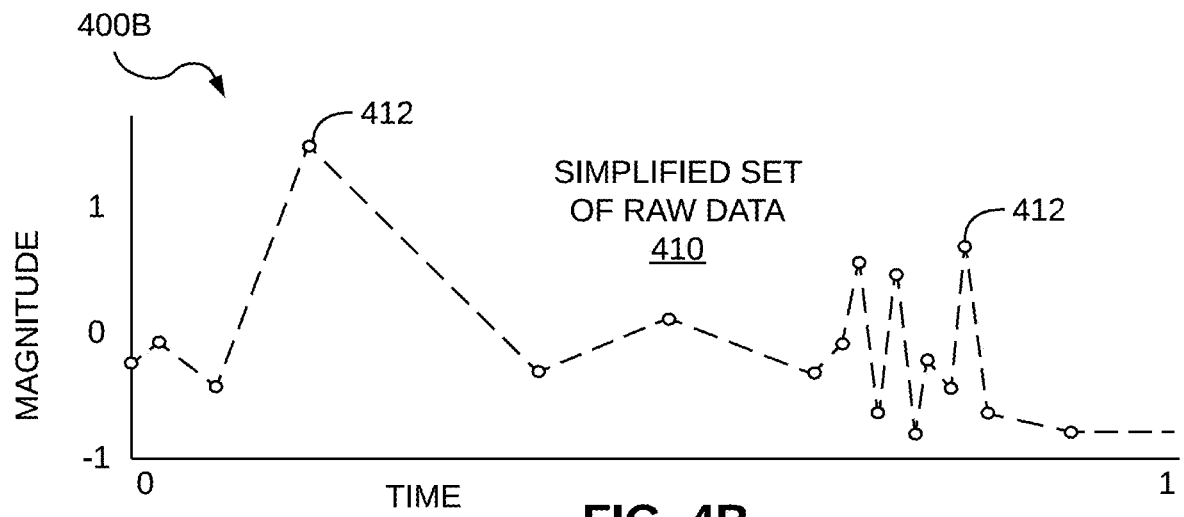
FIG. 4B is a data plot displaying an example simplified set of raw data derived from the application of a dataset simplification algorithm to the raw data of FIG. 4A.

FIG. 4B is a data plot 400B displaying an example simplified set of raw data 410 derived from the application of a dataset simplification algorithm to the raw data 402 of FIG. 4A. The simplified set of raw data 410 contains far fewer data points than the raw data 402 itself. The simplified set of raw data 410 is shown as a set of circular data points 412. Dashed lines between the data points 412 indicate interpolated values where no data points are stored between the data points 412. The data plot 400B is shown with arbitrary units of magnitude along the Y axis and arbitrary units of time along the X axis for exemplary purposes only.

Figure 4C:
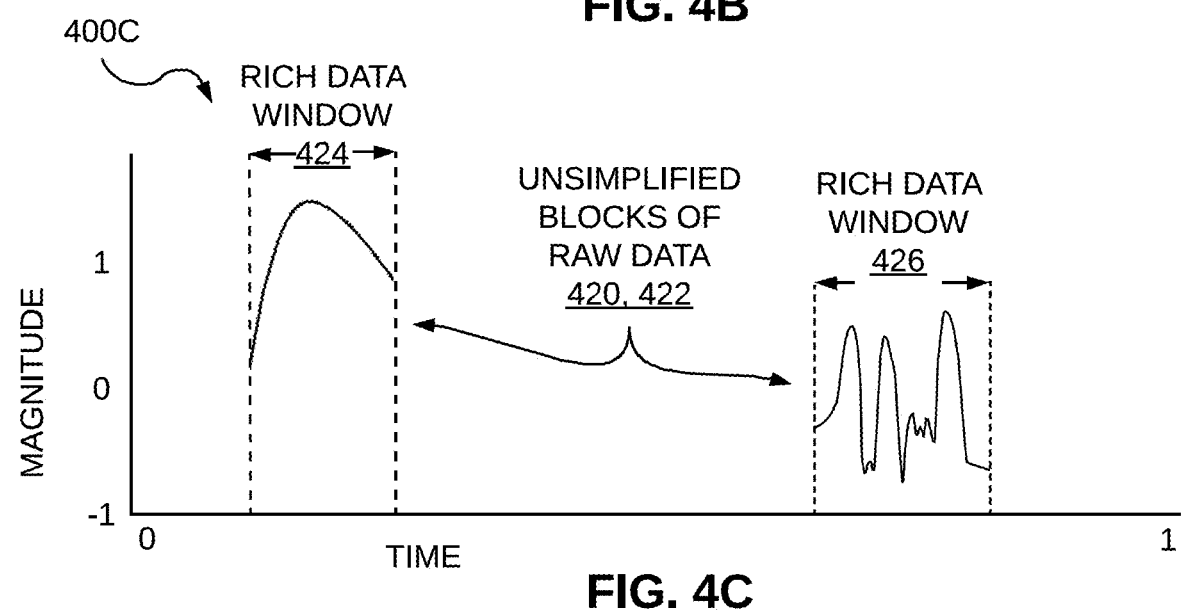
FIG. 4C is a data plot displaying example unsimplified blocks of raw data derived from the application of a raw data capture algorithm to the raw data of FIG. 4A.

FIG. 4C is a data plot 400C displaying example unsimplified blocks of raw data 420, 422 derived from the application of a raw data capture algorithm to the raw data of 402 FIG. 4A. The unsimplified blocks of raw data 420, 422 may be understood to be examples of the unsimplified block of raw data 224 captured by the asset tracking device 200 of FIG. 2. The unsimplified blocks of raw data 420, 422 span rich data windows 424, 426, respectively. The unsimplified blocks of raw data 420, 422 may be understood to be snippets of the raw data 402 covered by the rich data windows 424, 426. As can be seen by comparison to the simplified set of raw data 410 of FIG. 4B, the unsimplified blocks of raw data 420, 422 contain significantly more data points than the simplified set of raw data 410, which may be particularly useful for rich data analysis, such as machine learning.

Figure 5:
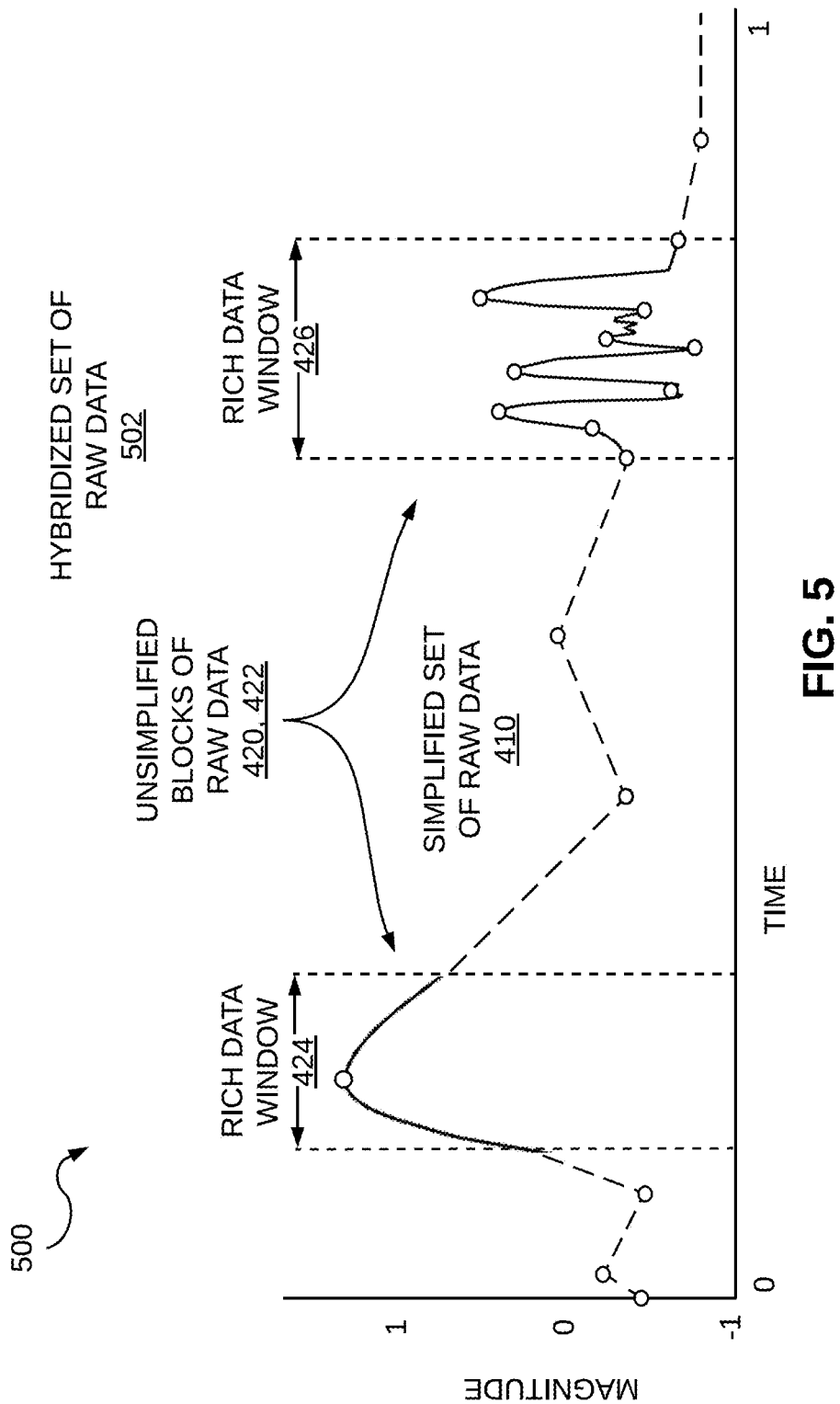
FIG. 5 is a data plot displaying an example hybridized set of raw data that combines the simplified set of raw data of FIG. 4B and the unsimplified blocks of raw data of FIG. 4C.

FIG. 5 is a data plot 500 displaying an example hybridized set of raw data 502 that contains the simplified set of raw data 410 of FIG. 4B and the unsimplified blocks of raw data 420, 422 of FIG. 4C. The hybridized set of raw data 502 contains small amounts of data throughout its duration that would be sufficiently detailed to support a telematics service (the simplified set of raw data 410), in addition to highly detailed snippets of raw data for rich data analysis that provide detailed descriptions of particularly interesting events that occur in the raw data (the unsimplified blocks of raw data 420, 422). The hybridized set of raw data 502 illustrates how the techniques described herein may be applied to enable an asset tracking device to capture raw data in an efficient matter during a majority of its operation while collecting short high-density snippets of data to describe interesting events detected in the raw data.

Figure 6:
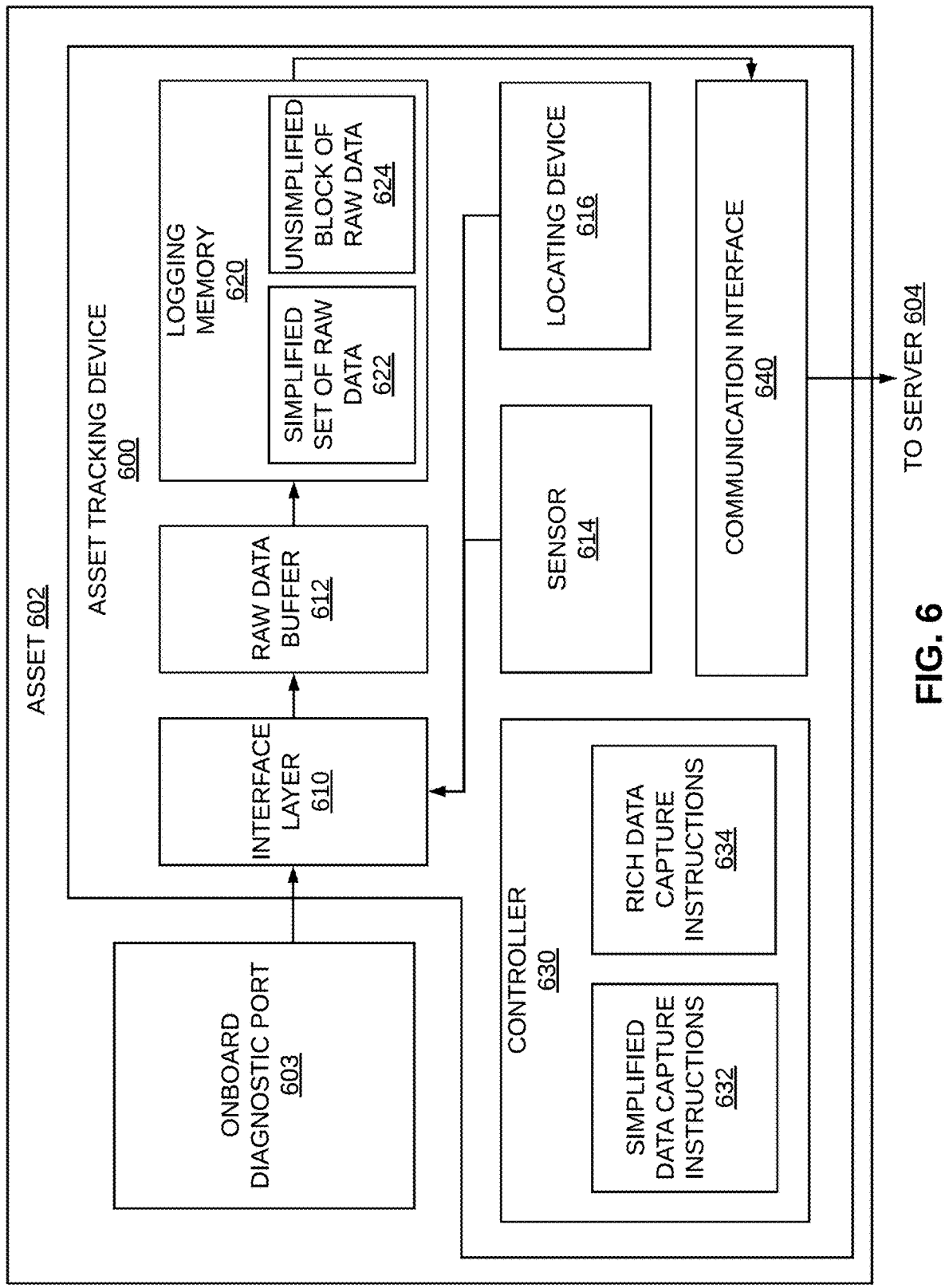
FIG. 6 is a block diagram of another example asset tracking device that captures simplified data and rich data, the asset tracking device including a raw data buffer that receives raw data through a sensor onboard the asset tracking device, a locating device onboard the asset tracking device, and an on-board diagnostic port of the asset.

FIG. 6 is a block diagram of another example asset tracking device 600 that captures simplified data and rich data. The asset tracking device 600 is similar to the asset tracking device 200 of FIG. 2, with components numbered in the "600" series rather than the "200" series. Thus, the asset tracking device 600 is located onboard an asset 602, and includes an interface layer 610, a logging memory 620 containing a simplified set of raw data 622 and unsimplified block of raw data 624, a controller 630 to execute simplified data capture instructions 632 and rich data capture instructions 634, and a communication interface 640 to communicate with a server 604. For further description of these components, reference may be had to the like components in the description of the asset tracking device 200 of FIG. 2.

In the present example, the asset 602 includes a vehicle, such as a transport truck or passenger vehicle, that features an onboard diagnostic port 603. The onboard diagnostic port 603 provides access to asset data (e.g., vehicle information data) that can be obtained by an interface of the interface layer 610. Thus, the interface layer 610 is able to gather engine speed data, battery voltage, fuel level, and other data made available through the onboard diagnostic port. Further, the asset tracking device includes a sensor 614 to gather sensor data at the asset tracking device 600. The sensor 614 may include a kinematic sensor (e.g., an accelerometer or gyroscope), magnetometer, temperature sensor, or another type of sensor that can be obtained by an interface of the interface layer 610. The asset tracking device 600 may include multiple sensors 614. The asset tracking device 600 further includes a locating device 616 to obtain location data of the asset tracking device 600. The locating device 616 may include a GPS module, GNSS module (e.g., an U-BLOX ZOE M8G), or other interface to obtain a location from a locating system and that can be obtained by an interface of the interface layer 610. The asset tracking device 600 may include multiple locating devices 616. Any of the onboard diagnostic port 603, sensor 614, and locating device 616 may be referred to as a data source.

The interface layer 610 may receive raw data from the sensor 614, locating device 616, or the onboard diagnostic port 603. The asset tracking device 600 further includes a raw data buffer 612 to buffer such raw data received from the interface layer 610. The raw data buffer 612 provides temporary memory storage for the raw data before it is logged to the logging memory 620. When the controller 630 executes simplified data capture instructions 632 and rich data capture instructions 634, the controller 630 may monitor the raw data in the raw data buffer 612 for satisfaction of a simplified dataset logging trigger or a rich data capture trigger. Thus, raw data flows from one or more of the onboard diagnostic port 603, sensor 614, and locating device 616, through to the interface layer 610, and stored temporarily on the raw data buffer 612, after which a portion of the raw data is logged in logging memory 620 (as a simplified set of raw data 622 or an unsimplified block of raw data 624), prior to transmission by the communication interface 640 to the server 604.

The size of the data window that is spanned by the unsimplified block of raw data 624 may be determined in part by a characteristic of the raw data buffer 612, such as its size or refresh rate. In particular, the maximum amount of data that is included in the data window prior to the incident that satisfies the rich data capture trigger may be determined by the amount of raw data of the relevant data type that is stored in the raw data buffer 612 before the raw data buffer 612 is overwritten (as any earlier data may have been overwritten), but the maximum amount of data that is included in the data window after the incident may not be so limited. For example, if the raw data buffer 612 is capable of storing 1000 ms of accelerometer data before accelerometer data becomes overwritten, the data window for accelerometer data in any unsimplified block of raw data 624 may include data up to 1000 ms prior to satisfaction of the rich data capture trigger, and may include 1000 ms or more of accelerometer data after satisfaction of the rich data capture trigger. As will be seen below (e.g., in FIG. 11), the size of the data window after the satisfaction of the rich data capture trigger may be further configurable.

Figure 7:
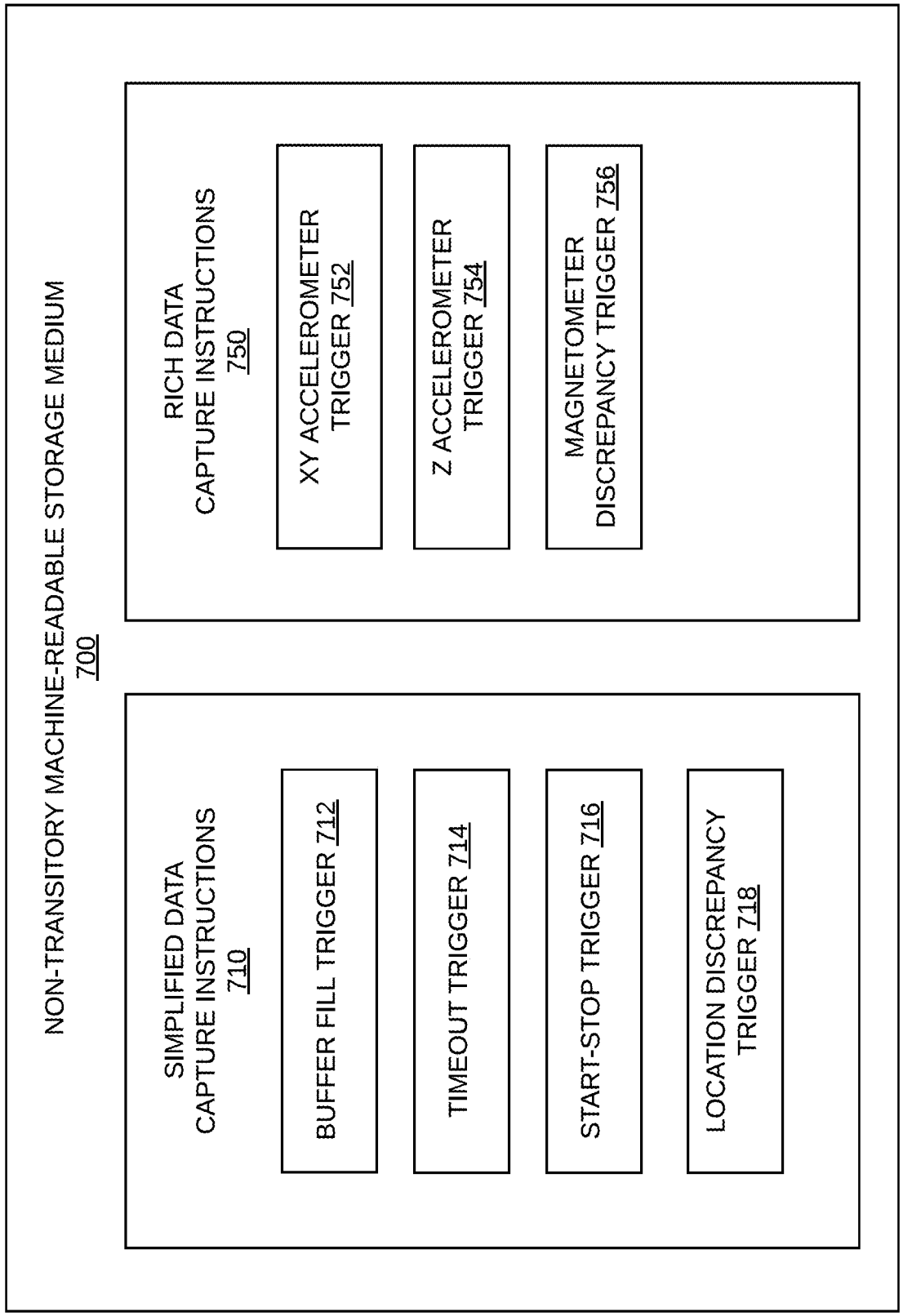
FIG. 7 is a block diagram of example non-transitory machine-readable storage medium that contains simplified data capture instructions and rich data capture instructions.

FIG. 7 is a block diagram of example non-transitory machine-readable storage medium 700 that contains simplified data capture instructions 710 and rich data capture instructions 750. The simplified data capture instructions 710 may be understood to be one example of the simplified data capture instructions 632 of FIG. 6, and the rich data capture instructions 750 may be understood to be one exampled of the rich data capture instructions 634 of FIG. 6, each of which may be stored on memory of the controller 630. Thus, for convenience, description of the instructions 710 and instructions 750 will be made with reference to the asset tracking device 600 of FIG. 6, but this is not limiting, and the instructions 710, 750 may be performed by other systems and/or devices.

The simplified data capture instructions 710 contains simplified data capture triggers 712, 714, 716, and 718, each of which cause the controller 630 to log a simplified set of raw data 622 when obtainment of the raw data results in satisfaction of a simplified data capture trigger, such as when a particular signal feature in the raw data is detected or when a particular operating condition of the asset tracking device 600 is met. It is emphasized that the simplified data capture instructions 710 shown are for exemplary purposes only, and the simplified data capture instructions 710 may contain other or additional simplified data capture triggers.

For example, the buffer fill trigger 712 may cause the controller 630 to log a simplified set of raw data 622 when the raw data buffer 612 becomes full of either a particular data type or as a whole. When the raw data buffer 612 becomes full, the controller 630 may perform a dataset simplification algorithm on the data present in the raw data buffer 612 and store the resulting simplified dataset in the memory 220 prior to the raw data buffer 612 being cleared or overwritten. Thus, data may be logged in accordance with a hardware limitation of the asset tracking device 200.

As another example, the timeout trigger 714 may cause the controller 630 to log a simplified set of raw data 622 when a timeout value is reached. When no simplified set of raw data 622 has been logged within a particular time (e.g., 100 seconds), the controller 630 may perform a dataset simplification algorithm on the data present in the raw data buffer 612 and store the resulting simplified dataset in the logging memory 620. Thus, a baseline frequency for data logging may be maintained.

As another example, the start-stop trigger 716 may cause the controller 630 to log a simplified set of raw data 622 when the asset 602 is determined to have come to a stop or has started moving from a stop. When the asset 602 is determined to have come to a stop or have started moving from a stop, which may have been determined by an analysis of location data obtained by the locating device 616, the controller 630 may perform a dataset simplification algorithm on the data present in the raw data buffer 612 and store the resulting simplified dataset in the logging memory 620. Thus, it may be ensured that data pertaining to critical points in the travel of the asset 202, which may include starts and stops, are logged.

As another example, the location discrepancy trigger 718 may cause the controller 630 to log a simplified set of raw data 622 when the measured location of the asset tracking device 200 is determined to differ excessively from a predicted position of the asset tracking device 200. That is, the asset tracking device 200 may periodically predict its future position, and when location data obtained by the locating device 616 indicates that the asset tracking device 200 is distant from that future position by a particular threshold value, the controller 630 may perform a dataset simplification algorithm on the data present in the raw data buffer 612 and store the resulting simplified dataset in the logging memory 620.

Again, it is emphasized that the simplified data capture instructions 710 shown are for exemplary purposes only, and the simplified data capture instructions 710 may contain additional simplified data capture triggers, including triggers which may be satisfied by criteria pertaining to other data types in the raw data or other operating conditions of the asset tracking device 200.

Similarly, the rich data capture instructions 750 contains rich data capture triggers 752, 754, and 756, each of which cause the controller 630 to log an unsimplified block of raw data 624 when certain criteria are met. It is emphasized that the rich data capture instructions 750 shown are for exemplary purposes only, and the rich data capture instructions 750 may contain other or additional rich data capture triggers.

For example, the XY accelerometer trigger 752 may cause the controller 630 to log an unsimplified block of raw data 624 when a composite of accelerometer data in the X direction and accelerometer data in the Y direction exceeds a threshold value (e.g., 2.5 g). That is, the sensor 614 includes an accelerometer, and when the controller 630 detects a disturbance in the XY plane that surpasses a threshold value, the controller 630 causes an unsimplified block of raw data 624 to be logged to the logging memory 620.

The XY accelerometer trigger 752 may be employed for the detection and analysis of incidents in which the asset 602 (e.g., a vehicle) is involved in a vehicle collision or other minor damage and impact-related event. The unsimplified block of raw data 624 that is logged may contain accelerometer data in the X and Y directions, and may further contain accelerometer data in the Z direction, engine speed data collected through the onboard diagnostic port 603, location data collected from the locating device 616, or any other data that may assist in the analysis of a vehicle collision or other impact-related event. Thus, data collected from the XY accelerometer trigger 752 may be used in vehicle collision reconstruction, vehicle impact analysis, and other forms of analysis. Such analyses may be particularly benefited by the rich set of data provided by the unsimplified block of raw data 624, which may enable advanced forms of analytics, including machine learning techniques.

As another example, the Z accelerometer trigger 754 may cause the controller 630 to log an unsimplified block of raw data 624 when accelerometer data in the Z direction exceeds a threshold value. That is, the sensor 614 includes an accelerometer, and when the controller 630 detects a disturbance in the Z direction that surpasses a threshold value, the controller 630 causes an unsimplified block of raw data 624 to be logged to the logging memory 620.

The Z accelerometer trigger 754 may be employed for the detection and analysis of incidents in which the asset 602 (e.g., a vehicle) is involved in travelling over a pothole, speedbump, or other abnormal surface. The unsimplified block of raw data 624 that is logged may contain accelerometer data in the Z direction, and may further contain accelerometer data in the X and Y directions, engine speed data collected through the onboard diagnostic port 603 location data collected from the locating device 616, or any other data that may assist in the analysis of an event in which the asset 602 travels over a pothole, speedbump, or other abnormal surface.

As another example, the magnetometer discrepancy trigger 756 may cause the controller 630 to log an unsimplified block of raw data 624 when a magnetometer reading differs from a gyroscopic reading. That is, the asset tracking device 600 may include a gyroscope (a sensor 614) and a magnetometer (another sensor 614) to calibrate the yaw dimension measured by the gyroscope, and when the controller 630 detects a discrepancy between the magnetometer and the gyroscope that exceeds a threshold value, the controller 630 causes an unsimplified block of raw data 624 to be logged to the logging memory 620. The unsimplified block of raw data 624 that is logged may contain magnetometer data and gyroscope data.

Again, it is emphasized that the rich data capture instructions 750 shown are for exemplary purposes only, and the rich data capture instructions 750 may contain additional rich data capture triggers, including triggers which may be satisfied by criteria pertaining to other data types in the raw data or other operating conditions of the asset tracking device 200.

FIG. 8 is a data plot 800 that displays a hybridized set of raw data 800 that is similar to the hybridized set of raw data 502 of FIG. 5, with elements numbered in the "800" series rather than the "500" series. Thus, the hybridized set of raw data 800 includes a simplified set of raw data 810 and unsimplified blocks of raw data 820, 822.

However, the unsimplified blocks of raw data 820, 822 contain raw data of different data types spanning differently sized rich data windows 824, 826, and 828, 830, respectively. These unsimplified blocks of raw data 820, 822 may have been generated when the satisfaction of a rich data capture trigger caused additional contextual data of a different data type than the data type evaluated for satisfaction of the rich data capture trigger to be logged.

For example, the unsimplified block of raw data 820 may have been logged upon satisfaction of the XY accelerometer trigger 752 of FIG. 7, and the unsimplified block of raw data 820 may include XY accelerometer data (a first data type) spanning the rich data window 826, and may further contain vehicle location data (a second data type) spanning the rich data window 824. The rich data window 826 may be a more narrow window of highly dense data, whereas the rich data window 824 may be a broader window of less dense data. That is, the XY accelerometer data may be collected at a higher frequency than the vehicle location data, and thus the vehicle location data may be collected over a broader data window to ensure that an adequate number of location points are logged to provide sufficient context around the incident. For example, the XY accelerometer data may be collected at a frequency of about 100 Hz (one hundred times per second), and its data window may span about two seconds in length, whereas the vehicle location data may be collected at a frequency of about 1 Hz (once per second), and its data window may span about ten seconds in length. The rich data window 824 spanned by the vehicle location data may be referred to as a supplementary data window because it provides supplementary data to the data type that was evaluated for satisfaction of the rich data capture trigger.

Figure 9:
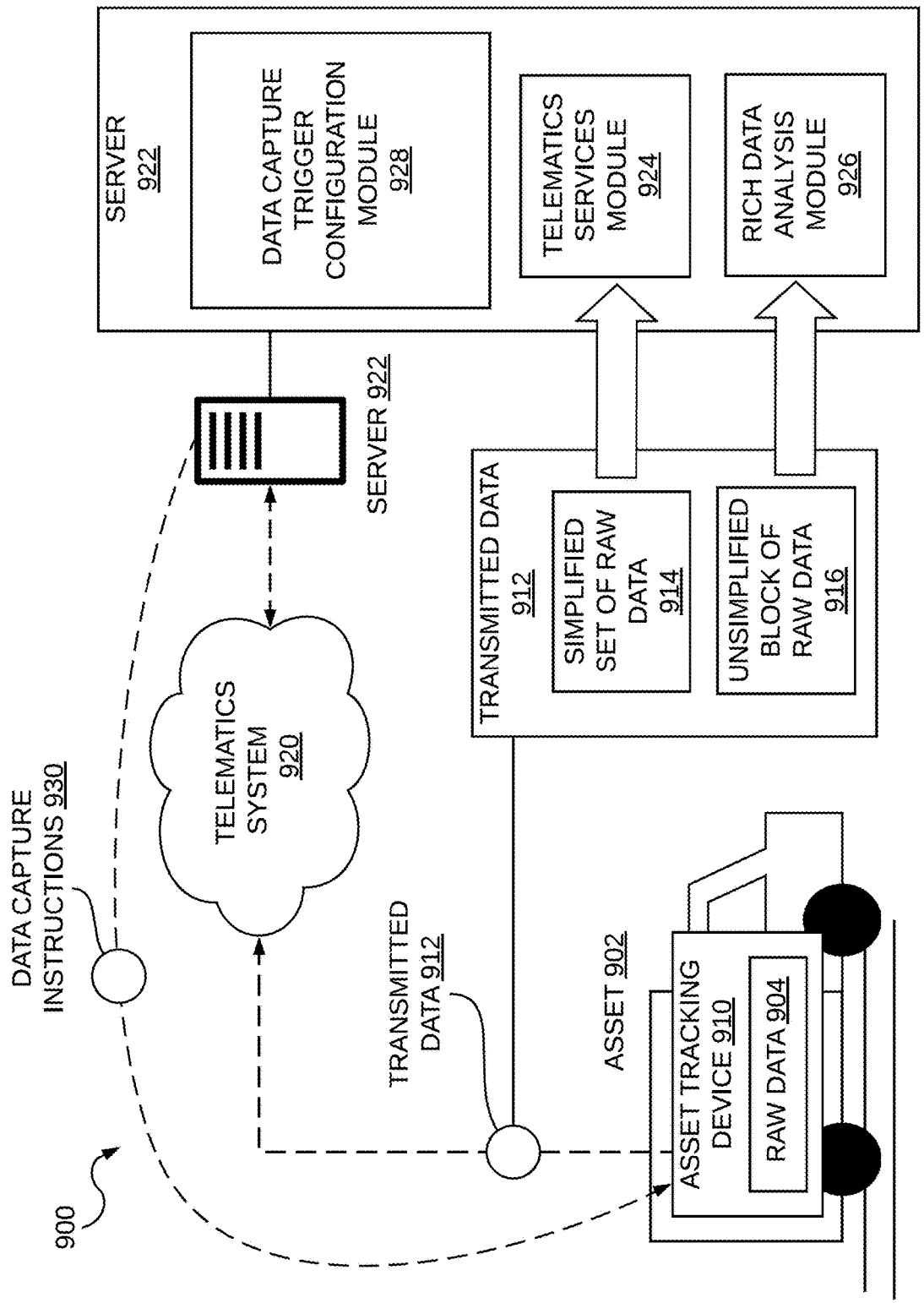
FIG. 9 is a schematic diagram of another example system for capturing data from assets or asset tracking devices, the system including a data capture trigger configuration module to configure rich data capture triggers.

FIG. 9 is a schematic diagram of another example system 900 for capturing data from assets or asset tracking devices. The system 900 is similar to the system 100 of FIG. 1, and thus includes an asset tracking device 910 onboard an asset 902 to obtain raw data 904 from a data source onboard the asset 902. Further, the asset tracking device 910 monitors the raw data 904 for satisfaction of a simplified data capture trigger, and when the simplified data capture trigger is satisfied, performs a dataset simplification algorithm on the raw data 904 to generate a simplified set of raw data 914 and log the simplified set of raw data 914. Further, the asset tracking device 910 monitors the raw data 904 for satisfaction of a rich data capture trigger, and when the rich data capture trigger is satisfied, identifies an unsimplified block of raw data 916 in the raw data 904 for rich data analysis and logs the unsimplified block of raw data 916. The asset tracking device 910 transmits the simplified set of raw data 914 and the unsimplified block of raw data 916, shown as transmitted data 912, to a telematics system 920, which includes the server 922. The server 922 runs a telematics services module 924 and a rich data analysis module 926. For further description of the above components, the system 100 of FIG. 1 may be referenced.

However, in the system 900, the server 922 provides a data capture trigger configuration module 928 to configure a rich data capture trigger, which may be included in data capture instructions 930 and transmitted to the asset tracking device 910. The rich data capture trigger defines when a controller of the asset tracking device 910 onboard the asset 902 is to identify and log an unsimplified block of raw data 916 for rich data analysis.

The data capture instructions 930 may contain a complete set of instructions to cause the asset tracking device 910 to capture the raw data 904 according to a dataset simplification algorithm (such as, as, for example, in the simplified data capture instructions 232 of FIG. 2.) and a rich data capture algorithm (such as, for example, in the rich data capture instructions 234 of FIG. 2), or may be in the form of merely an update to existing instructions onboard the asset tracking device 910 in which the asset tracking device 910 is configured with a new rich data capture trigger. In either case, the data capture instructions 930 contain a rich data capture trigger obtained by the data capture trigger configuration module 928.

Figure 11:
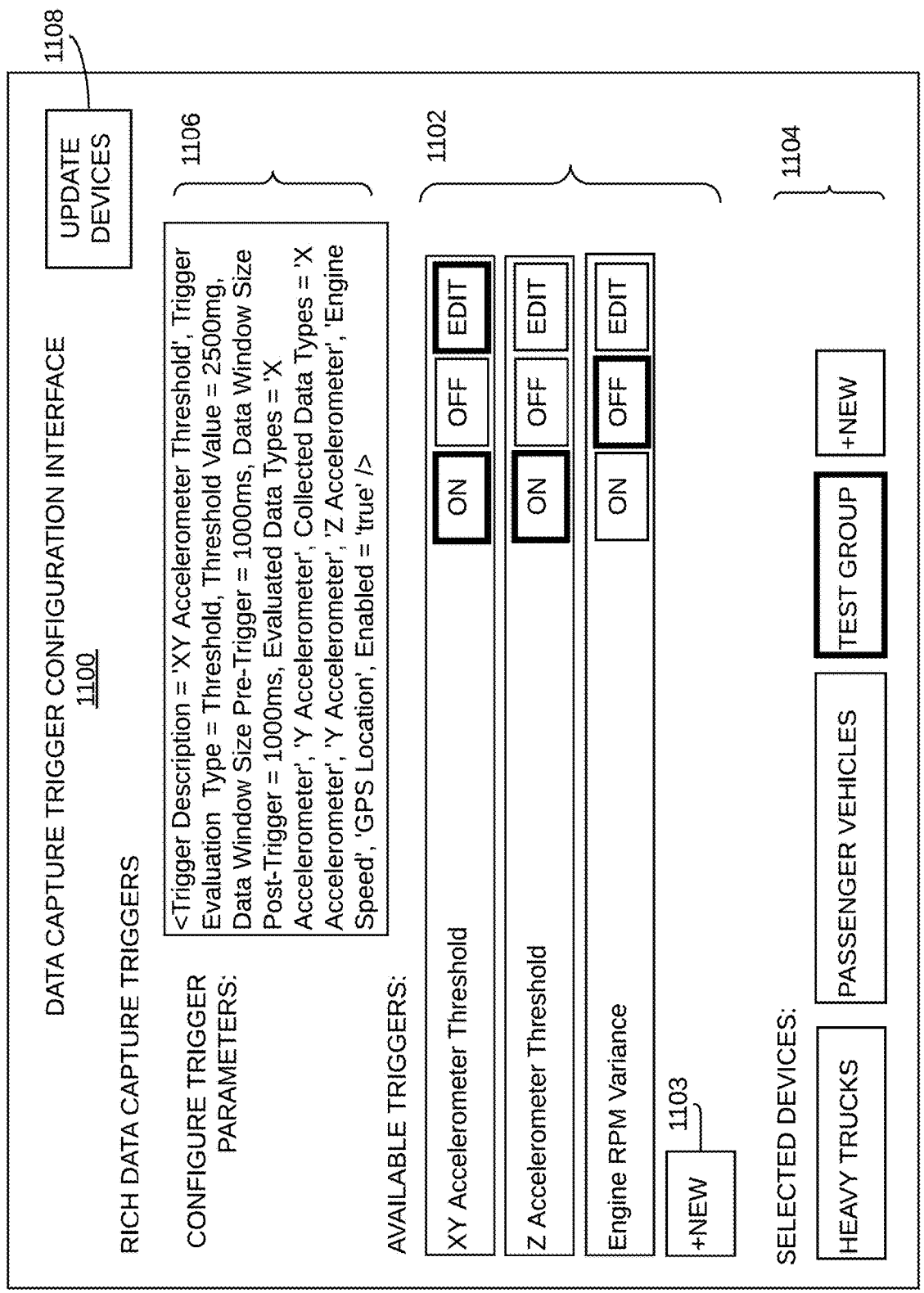
FIG. 11 is a schematic diagram of an example user interface to configure a rich data capture trigger for execution at an asset or asset tracking device.

The data capture trigger configuration module 928 obtains, whether through selection from a database or through generation via a user interface, a rich data capture trigger. The data capture trigger configuration module 928 may provide a user interface, accessible by a user with access to the telematics system 920, to configure the rich data capture trigger. An example of such a user interface is shown in FIG. 11, below.

Thus, the server 922 obtains the rich data capture trigger, transmits data capture instructions 930 to the asset tracking device 910, and, following data capture onboard the asset tracking device 910, receives the simplified set of raw data 914 and the unsimplified block of raw data 916 from the asset tracking device 910.

Figure 10:
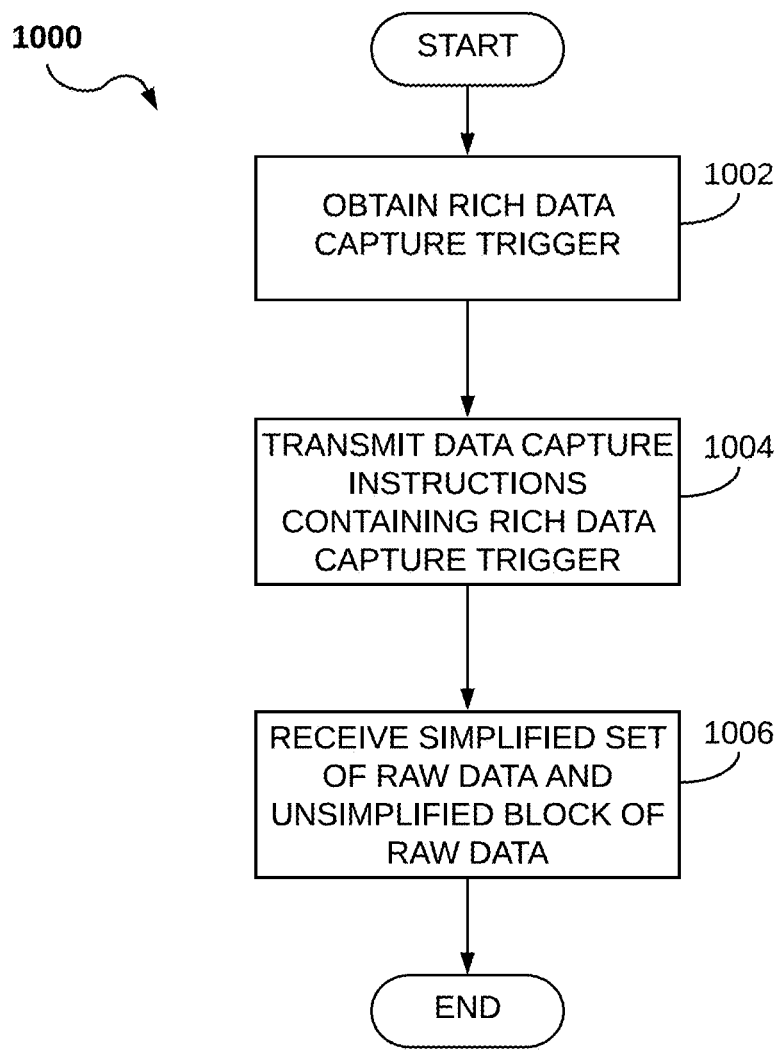
FIG. 10 is a flowchart of an example method for capturing data from an asset or asset tracking device that involves transmission of a rich data capture trigger to the asset tracking device.

FIG. 10 is a flowchart of an example method 1000 for capturing data from an asset or asset tracking device. The method 1000 involves transmission of a rich data capture trigger to the asset tracking device. The method 1000 may be understood to be one example of a method by which the server 922 configures the asset tracking device 910 with data capture instructions 930 that contain the rich data capture trigger, and obtains the simplified set of raw data 914 and unsimplified block of raw data 916 from the asset tracking device 910. However, this is not limiting, it is to be understood that the method 1000 may be performed by other systems and/or devices.

At block 1002, the server 922 obtains a rich data capture trigger that defines when a controller of the asset tracking device 910 onboard an asset 902 is to identify the unsimplified block of raw data 916 in raw data 904 on the asset tracking device 910 for rich data analysis. The raw data 904 is obtained by the asset tracking device 910 from a data source onboard the asset 902.

At block 1004, the server 922 transmits data capture instructions 930 to the asset tracking device 910. As described above, the data capture instructions 930 may contain a complete set of instructions or merely an update to instructions for the asset tracking device 910.

The data capture instructions 930 cause a controller of the asset tracking device 910 to monitor the raw data 904 for satisfaction of a simplified data capture trigger. When the simplified data capture trigger is satisfied, the controller of the asset tracking device 910 performs a dataset simplification algorithm on the raw data 904 to generate the simplified set of raw data 914, and logs the simplified set of raw data 914. The data capture instructions 930 further cause the controller to monitor the raw data 904 for satisfaction of a rich data capture trigger, and when the rich data capture trigger is satisfied, identify the unsimplified block of raw data 916 in the raw data 904 for rich data analysis and log the unsimplified block of raw data 916. The unsimplified block of raw data 916 spans a data window that covers a time at which the rich data capture trigger was satisfied. The unsimplified block of raw data 916 contains raw data that is additional to the raw data contained in the simplified set of raw data 914.

Following data capture onboard the asset tracking device 910, at block 1006, the server 922 receives the simplified set of raw data 914 and the unsimplified block of raw data 916 from the asset tracking device 910.

The method 1000 may involve the server 922 providing a user interface to configure the rich data capture trigger and/or the data window so that the rich data capture trigger may be obtained by configuration through the user interface. The data capture instructions 930 may cause a controller of the asset tracking device 910 to, as discussed above, evaluate a rich data capture trigger with respect to one or more data types, which may involve determining whether a value or a composite value of such data types surpass a threshold values, and capture relevant raw data across one or more data windows that may be of different duration. The user interface provided by the server 922 may enable the configuration of any of such data types, threshold values, data windows, or any other aspect of such rich data capture triggers.

The method 1000 may involve the technical infrastructure of the telematics system 920, as represented by the server 922, flagging the unsimplified block of raw data 916 for separate treatment from the simplified set of raw data 914. Further, the method 1000 may further involve the server 922 processing the simplified set of raw data 914 for telematics services via the telematics services module 924, and performing rich data analysis on the unsimplified block of raw data 916 via the rich data analysis module 926.

The method 1000 may be embodied in instructions, which may be termed data capture control instructions, stored on a non-transitory machine-readable storage medium that is executable by a processor of the server 922 to perform the method 1000. The non-transitory machine-readable storage medium may include read-only memory (ROM), random-access memory (RAM), flash memory, magnetic storage, optical storage, and similar, or any combination thereof, for storing instructions and data as discussed herein.

FIG. 11 is a schematic diagram of an example user interface 1100 to configure a rich data capture trigger for execution at an asset or asset tracking device. The user interface 1100 may be understood to be one example of a user interface provided by the rich data capture configuration module 928 of FIG. 9 for the configuration of a rich data capture trigger of the data capture instructions 930. However, this is not limiting, it is to be understood that the user interface 1100 may be employed by other systems and/or devices.

The user interface 1100 includes a trigger selection component 1102 to enable a user to select one or more rich data capture triggers for configuration. The user interface 1100 further includes a rich data capture trigger generation component 1103 to add a new rich data capture trigger to the trigger selection component 1102. The trigger selection component 1102 enables a user to select which rich data capture triggers, of a list of available triggers (e.g., the "XY Accelerometer Threshold" trigger, "Z Accelerometer Threshold" trigger, and "Engine RPM Variance" trigger, as shown), are enabled for a particular asset tracking device or group of asset tracking devices. The trigger selection component 1102 includes, for each rich data capture trigger, an "ON" button to enable the rich data capture trigger on the selected devices, an "OFF" button to disable the rich data capture trigger on the selected devices, and an "EDIT" button to configure a particular rich data capture trigger.

The user interface 1100 further includes a device selection component 1104 to enable a user to select one or more asset tracking devices or groups of asset tracking devices for configuration of the rich data capture triggers thereof. That is, a user may select one or more asset tracking devices (e.g., the "TEST GROUP" as shown) in the device selection component 1104, and use the trigger selection component 1102 to determine which rich data capture triggers are enabled for the selected devices.

The groups of asset tracking devices may be categorized according to characteristics of the assets being tracked by those asset tracking devices. For example, asset tracking devices may be categorized according to the vehicle type being tracked (e.g., "HEAVY TRUCKS" and "PASSENGER VEHICLES"). Different categories of assets may be of interest for different types of rich data analyses. For example, a researcher may be particularly interested in studying incidents of heavy trucks travelling over potholes, and thus may select the "HEAVY TRUCKS" grouping under the device selection component 1104 and enable the "Z Accelerometer Threshold" trigger under the trigger selection component 1102 so that all asset tracking devices in the "HEAVY TRUCKS" group will transmit rich blocks of raw data relating to trucks travelling over potholes. As another example, a researcher may select the "PASSENGER VEHICLES" grouping under the device selection component 1104 and enable the "XY Accelerometer Threshold" trigger under the trigger selection component 1102 so that all asset tracking devices in the "PASSENGER VEHICLES" grouping will transmit rich blocks of raw data relating to possible vehicle collisions and other impact events. Thus, a research is able to push different rich data capture triggers to different groups of asset tracking devices tracking different types of assets for desired purposes.

The user interface 1100 further includes a trigger parameter configuration component 1106 to enable a user to configure any aspect of a rich data capture trigger, including of any data type involved in evaluation of the trigger, any threshold value involved in the evaluation of the trigger, any data window, or any other aspect of a rich data capture trigger. For exemplary purposes, the trigger parameter configuration component 1106 is shown for example as a text box that enables text configuration of the parameters of a rich data capture trigger. Thus, it may be seen that the "XY Accelerometer Threshold" trigger may be configured with respect to the trigger description ("XY Accelerometer Threshold"), trigger evaluation type ("Threshold"), threshold value ("2500 mg"), data window size pre-trigger ("1000 ms"), data window size post-trigger ("1000 ms"), evaluated data types ("X Accelerometer", "Y Accelerometer", "Z Accelerometer"), collected data types ("X Accelerometer", "Y Accelerometer", "Z Accelerometer", "Engine Speed", "GPS Location", and the enabled/disabled status of the trigger for the selected devices ("true").

In other examples, additional trigger parameters may be configured. For example, a trigger parameter may include a maximum number of triggering events that are permitted to cause the rich data capture trigger to collect rich data within a given timeframe so that any given rich data trigger may be restricted from collecting unduly large amounts of data. As another example, a trigger parameter may include logic that dictates that the data window for a rich data capture trigger may be extended when the same rich data capture trigger is satisfied multiple times within a short time period. Thus, rather than several separate unsimplified blocks of raw data being collected one after the other (overlapping), a single contiguous unsimplified block of raw data may be collected to cover multiple instances of the same rich data capture trigger being satisfied within a short time period. For example, if the XY Accelerometer Threshold trigger were satisfied at 5 seconds, 5.9 seconds, and 6.5 seconds, rather than collecting three separate blocks of data from 4 seconds to 6 seconds, from 4.9 seconds to 6.9 seconds, and from 5.5 seconds to 7.5 seconds, the data window of the first instance of the satisfaction of the trigger may be extended to be from 4 seconds to 7.5 seconds, thereby covering all instances of satisfaction of the trigger within this time period as one contiguous block of data. A timestamp for each instance at which the rich data capture trigger was satisfied may be recorded in metadata. The XY Accelerometer Threshold Trigger may be configured in this way with parameters such as, for example, "Data Window Extendable='Yes'", "Data Window Extension Range='2000 ms'", and "Data Window Maximum Size=10000 ms", to enable the rich data capture trigger to extend the length of its data window, post satisfaction of the trigger, if that trigger is satisfied again within 2000 milliseconds of it being initially satisfied. The data window may be extended on a rolling basis with each instance of the trigger being satisfied, and thus the data window may be extended indefinitely until the trigger is not satisfied within the data window extension range of the last instance of its satisfaction, or until another threshold is met, such as a maximum size of the data window (e.g., 10,000 ms).

Different rich data capture triggers may collect the same types of data. For example, the XY Accelerometer Threshold trigger, when satisfied by a signal feature detected X and/or Y accelerometer data, may trigger the collection of X, Y, and Z accelerometer data. Similarly, the Z Accelerometer Threshold trigger, when satisfied by a signal feature in Z accelerometer data, may trigger the collection of X, Y, and Z accelerometer data. If the XY Accelerometer Threshold trigger and the Z Accelerometer Threshold were both triggered within the same time period, duplicate accelerometer data may be collected. However, in some examples, only one instance of the accelerometer data may be transferred from the raw data buffer to the logging memory, and metadata may indicate which portions of the accelerometer data pertain to the satisfaction of which trigger, thereby avoiding the saving and transmission of duplicate data. Some of such metadata may indicate that a particular point of accelerometer data was saved as pertaining to the satisfaction of two (or more) triggers. For example, a particular point of accelerometer data may be indicated as having been saved due to satisfaction of both the XY Accelerometer Threshold trigger and the Z Accelerometer Threshold trigger.

The user interface 1100 further includes an instruction transmission component 1108 to transmit data capture instructions to the selected asset tracking devices to configure the selected asset tracking devices to monitor raw data for the selected rich data capture triggers. The data capture instructions may be transmitted in the form of an update to the data capture instructions onboard the asset tracking devices (e.g., a firmware update, or in the form of a communication that merely instructs the asset tracking devices to enable or disable one or more rich data capture triggers which the asset tracking devices are already enabled to perform.

Thus, a telematics system may remain efficient in its collection of simplified data to support its telematics services without missing opportunities for more rigorous data analysis. Asset tracking devices may be configured to run rich data capture instructions in which raw data collected by the asset tracking device is evaluated for particular signal features that are indicative of events that warrant further analysis. These rich data capture instructions may be configured remotely and pushed to an individual asset tracking device for ease of testing and experimentation without impact to existing data collection techniques running on the asset tracking device.

The above disclosure describes that a rich data capture algorithm is to be applied on an asset tracking device in parallel with a dataset simplification algorithm so as to provide data for both a telematics service and for rich data analysis. However, it is contemplated that, in some examples, raw data may be captured from an asset tracking device for rich data analysis without the capture of simplified sets of raw data for a telematics services, as shown for example in FIG. 12 and FIG. 13, below. An asset tracking device may be configured in such a way if it is to be used primarily for the purpose of rich data collection, testing, experimentation, the study of vehicular operation and vehicular travel conditions, and the like.

Figure 12:
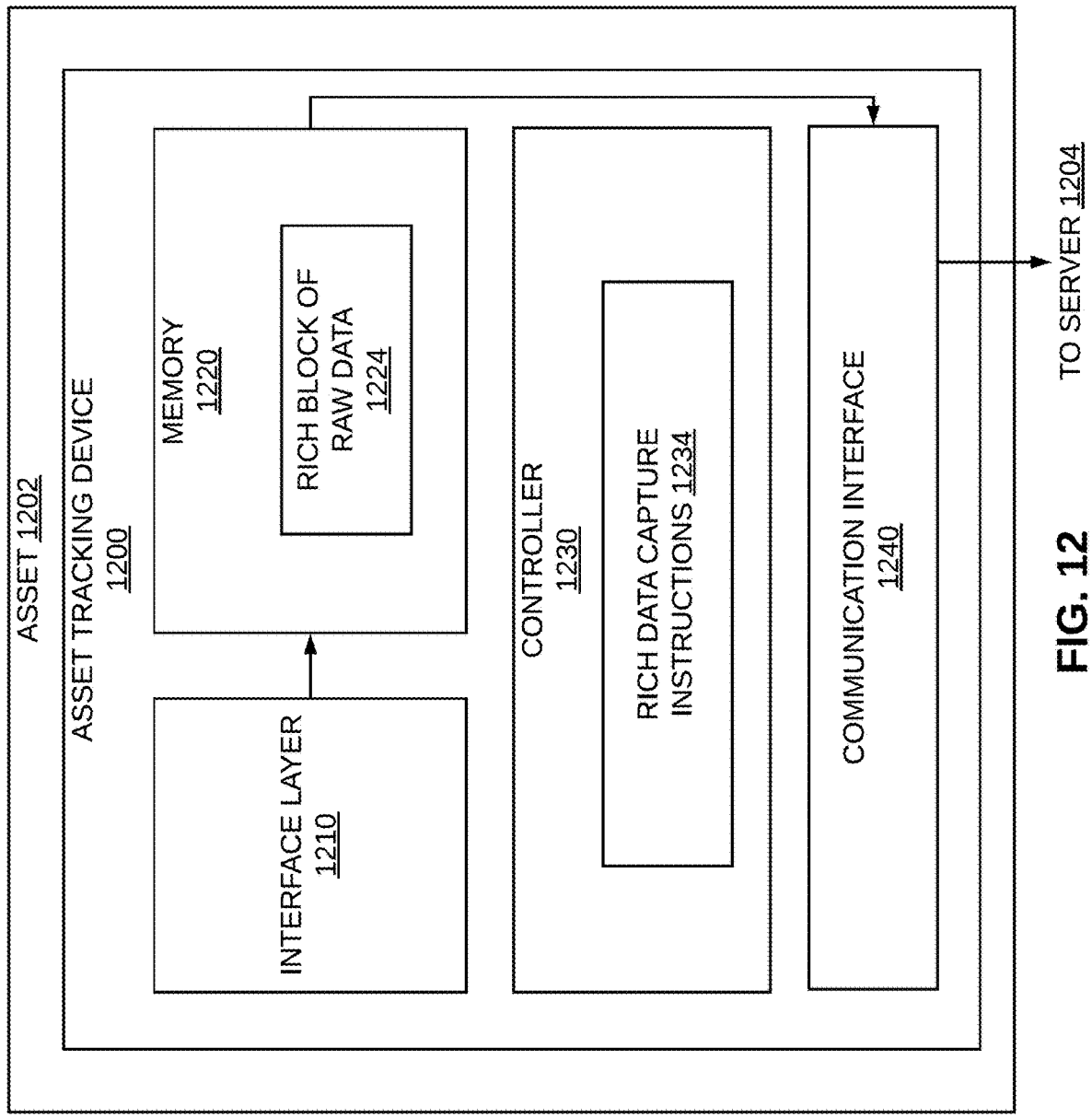
FIG. 12 is a block diagram of another example asset tracking device.

FIG. 12 is a block diagram of another example asset tracking device 1200 that captures rich data. The asset tracking device 1200 is similar to the asset tracking device 200 of FIG. 2, and therefore includes an interface layer 1210 to obtain raw data from a data source onboard an asset 1202, a memory 1220 to store the raw data, a controller 1230 to execute rich data capture instructions 1234, and a communication interface 1240. For further description of these components, the description of the asset tracking device 200 of FIG. 2 may be referenced.

The rich data capture instructions 1234 monitor the raw data for satisfaction of a rich data capture trigger. When the rich data capture trigger is satisfied, the controller 1230 identifies a rich block of raw data 1224 in the raw data for rich data analysis and logs the rich block of raw data. The rich block of raw data 1224 spans a data window that covers a time at which the rich data capture trigger was satisfied.

The communication interface 1240 transmits the rich block of raw data 1224 to a server 1204 for analysis.

Figure 13:
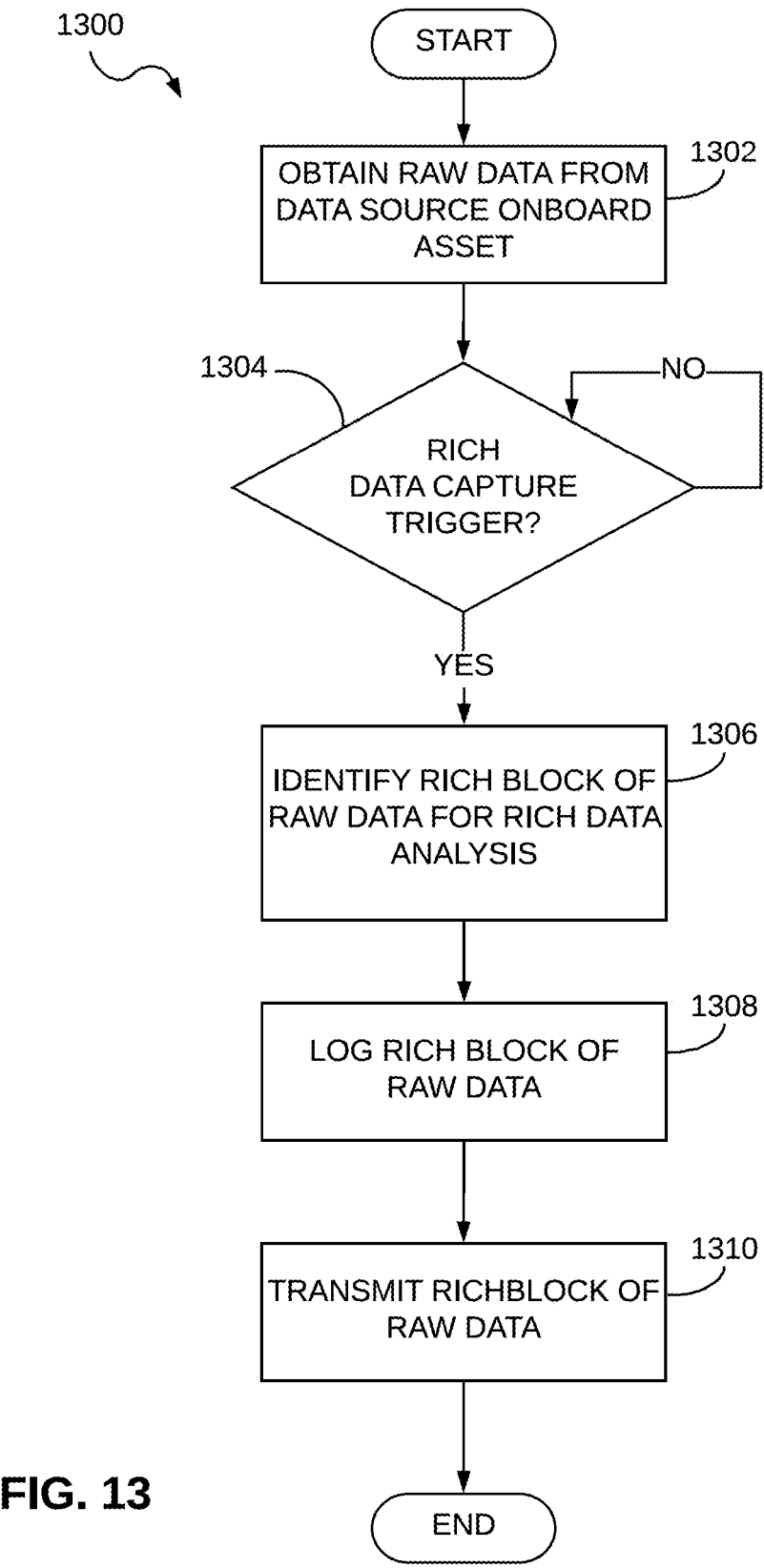
FIG. 13 is a flowchart of another example method for capturing data from an asset or asset tracking device.

FIG. 13 is a flowchart of another example method 1300 for capturing data from an asset or asset tracking device. The method 1300 may be understood to be one example of how the asset tracking device 1200 of FIG. 12 captures raw data relating to an asset. Thus, for exemplary purposes, the method 1300 will be described with reference to the asset tracking device 1200 of FIG. 2. However, it is to be understood that the method 300 may be applied by other asset tracking devices. Further, the method 1300 may be similar to the method 300 of FIG. 3, and therefore for further description of the blocks of the method 1300, the blocks of the method 300 may be referenced.

At block 1302, the interface layer 1210 of the asset tracking device 1200 obtains raw data from a data source onboard the asset 1202. At block 1304, the controller 1230 monitors the raw data for satisfaction of a rich data capture trigger. When the rich data capture trigger is satisfied, at block 1306, the controller 1230 identifies a rich block of raw data 1224 in the raw data for rich data analysis and logs the rich block of raw data in memory 1220 at block 1308. The rich block of raw data 1224 spans a data window that covers a time at which the rich data capture trigger was satisfied. At block 1310, the communication interface 1240 transmits the rich block of raw data 1224 to the server 1204.

The method 1300 may be embodied in instructions stored on a non-transitory machine-readable storage medium that is executable by the controller 1230 to perform the method 1300. The non-transitory machine-readable storage medium may include read-only memory (ROM), random-access memory (RAM), flash memory, magnetic storage, optical storage, and similar, or any combination thereof, for storing instructions and data as discussed herein.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
transmitting data capture instructions to an asset tracking device onboard an asset, wherein the data capture instructions cause a controller of the asset tracking device to:
monitor raw data for satisfaction of a simplified data capture trigger, the raw data obtained by the asset tracking device from a data source onboard the asset;
when the simplified data capture trigger is satisfied, perform a dataset simplification algorithm on the raw data to generate a simplified set of raw data;
monitor the raw data for satisfaction of a rich data capture trigger; and
when the rich data capture trigger is satisfied, identify an unsimplified block of raw data for rich data analysis, the unsimplified block of raw data containing raw data that is additional to raw data contained in the simplified set of raw data;
receiving the simplified set of raw data and the unsimplified block of raw data from the asset tracking device; and
providing a user interface, wherein one or more parameters associated with the rich data capture trigger is configured through the user interface.

2. The method of claim 1, wherein the unsimplified block of raw data spans a data window that covers a time at which the rich data capture trigger was satisfied, and the data window is configured through the user interface.

3. The method of claim 1, wherein:
the data capture instructions cause the controller to monitor the raw data for satisfaction of the rich data capture trigger by evaluating the rich data capture trigger for a first data type;
the unsimplified block of raw data comprises raw data of the first data type; and
selection of the first data type is configured through the user interface.

4. The method of claim 3, wherein evaluation of the rich data capture trigger comprises one or more of:
determining whether a value of a data point in the raw data of the first data type surpasses a first threshold value, wherein the first threshold value is configured through the user interface; and
determining whether a composite value of a group of data points in the raw data of the first data type that spans an evaluation window surpasses a second threshold value, wherein the second threshold value is configured through the user interface.

5. The method of claim 3, wherein the unsimplified block of raw data further comprises raw data of a second data type different from the first data type, and selection of the second data type is configured through the user interface.

6. The method of claim 5, wherein the raw data of the second data type spans a supplementary data window that is greater in duration than a data window that is spanned by the raw data of the first data type, wherein the supplementary data window is configured through the user interface.

7. The method of claim 1, wherein the unsimplified block of raw data is flagged by the asset tracking device for separate treatment from the simplified set of raw data, and wherein the method further comprises:
processing the simplified set of raw data for telematics services; and
performing the rich data analysis on the unsimplified block of raw data.

8. A system comprising:
an asset tracking device onboard an asset, the asset tracking device configured to:
obtain raw data from a data source onboard the asset;
monitor the raw data for satisfaction of a simplified data capture trigger;
when the simplified data capture trigger is satisfied, perform a dataset simplification algorithm on the raw data to generate a simplified set of raw data;
monitor the raw data for satisfaction of a rich data capture trigger;
when the rich data capture trigger is satisfied, identify an unsimplified block of raw data for rich data analysis, the unsimplified block of raw data containing raw data that is additional to raw data contained in the simplified set of raw data; and
transmit the simplified set of raw data and the unsimplified block of raw data; and
one or more servers configured to:
obtain the rich data capture trigger, wherein one or more parameters associated with the rich data capture trigger is configured through a user interface provided by the one or more servers;
transmit data capture instructions to the asset tracking device; and
receive the simplified set of raw data and the unsimplified block of raw data from the asset tracking device.

9. The system of claim 8, wherein the unsimplified block of raw data spans a data window that covers a time at which the rich data capture trigger was satisfied, and the data window is configured through the user interface.

10. The system of claim 8, wherein:
the data capture instructions cause the asset tracking device to monitor the raw data for satisfaction of the rich data capture trigger by evaluating the rich data capture trigger for a first data type;
the unsimplified block of raw data comprises raw data of the first data type; and
selection of the first data type is configured through the user interface.

11. The system of claim 10, wherein evaluation of the rich data capture trigger comprises one or more of:
determining whether a value of a data point in the raw data of the first data type surpasses a first threshold value, wherein the first threshold value is configured through the user interface; and
determining whether a composite value of a group of data points in the raw data of the first data type that spans an evaluation window surpasses a second threshold value, wherein second threshold value is configured through the user interface.

12. The system of claim 10, wherein the unsimplified block of raw data further comprises raw data of a second data type different from the first data type, and selection of the second data type is configured through the user interface.

13. The system of claim 12, wherein the raw data of the second data type spans a supplementary data window that is greater in duration than a data window that is spanned by the raw data of the first data type, wherein the supplementary data window is configured through the user interface.

14. The system of claim 8, wherein the unsimplified block of raw data is flagged by the asset tracking device for separate treatment from the simplified set of raw data, and wherein the one or more servers comprises:
- a telematics services module to process the simplified set of raw data; and
- a rich data analysis module to perform the rich data analysis on the unsimplified block of raw data.

15. A non-transitory machine-readable storage medium comprising instructions that when executed cause a processor of a computing device to:
- transmit data capture instructions to an asset tracking device onboard an asset, wherein the data capture instructions cause a controller of the asset tracking device to:
  - monitor raw data for satisfaction of a simplified data capture trigger, the raw data obtained by the asset tracking device from a data source onboard the asset;
  - when the simplified data capture trigger is satisfied, perform a dataset simplification algorithm on the raw data to generate a simplified set of raw data;
  - monitor the raw data for satisfaction of a rich data capture trigger; and
  - when the rich data capture trigger is satisfied, identify an unsimplified block of raw data for rich data analysis, the unsimplified block of raw data containing raw data that is additional to raw data contained in the simplified set of raw data;
- receive the simplified set of raw data and the unsimplified block of raw data from the asset tracking device; and
- provide a user interface, wherein one or more parameters associated with the rich data capture trigger is configured through the user interface.

16. The non-transitory machine-readable storage medium of claim 15, wherein the unsimplified block of raw data spans a data window that covers a time at which the rich data capture trigger was satisfied, and the data window is configured through the user interface.

17. The non-transitory machine-readable storage medium of claim 15, wherein:
- the data capture instructions cause the controller to monitor the raw data for satisfaction of the rich data capture trigger by evaluating the rich data capture trigger for a first data type,
- the unsimplified block of raw data comprises raw data of the first data type, and
- selection of the first data type is configured through the user interface.

18. The non-transitory machine-readable storage medium of claim 17, wherein evaluation of the rich data capture trigger comprises one or more of:
- determining whether a value of a data point in the raw data of the first data type surpasses a first threshold value, wherein the first threshold value is configured through the user interface; and
- determining whether a composite value of a group of data points in the raw data of the first data type that spans an evaluation window surpasses a second threshold value, wherein the second threshold value is configured through the user interface.

19. The non-transitory machine-readable storage medium of claim 17, wherein:
- the unsimplified block of raw data further comprises raw data of a second data type different from the first data type.

20. The non-transitory machine-readable storage medium of claim 19, wherein the raw data of the second data type spans a supplementary data window that is greater in duration than a data window that is spanned by the raw data of the first data type; and
- the supplementary data window is configured through the user interface.

\* \* \* \* \*